United States Patent
Watanabe et al.

(10) Patent No.: US 6,877,105 B1
(45) Date of Patent: Apr. 5, 2005

(54) METHOD FOR SENDING NOTICE OF FAILURE DETECTION

(75) Inventors: Ken Watanabe, Kawasaki (JP);
Toshikazu Yasue, Chigasaki (JP);
Tatsuya Watanuki, Ebina (JP)

(73) Assignee: Hitachi, Ltd., Tokyo (JP)

( * ) Notice: Subject to any disclaimer, the term of this patent is extended or adjusted under 35 U.S.C. 154(b) by 414 days.

(21) Appl. No.: 09/654,089

(22) Filed: Sep. 1, 2000

(30) Foreign Application Priority Data

Sep. 29, 1999 (JP) .......................................... 11-275704

(51) Int. Cl.$^7$ ............................................... G06F 11/00
(52) U.S. Cl. .............................. 714/4; 714/52; 714/712
(58) Field of Search ............................... 714/4, 52, 712

(56) References Cited

U.S. PATENT DOCUMENTS

| | | | | |
|---|---|---|---|---|
| 3,632,881 A | * | 1/1972 | Graham | 370/424 |
| 4,881,244 A | * | 11/1989 | Haug | 375/258 |
| 5,390,326 A | * | 2/1995 | Shah | 370/222 |
| 5,736,933 A | * | 4/1998 | Segal | 340/7.22 |
| 5,952,932 A | * | 9/1999 | Sørensen | 340/3.5 |
| 6,385,665 B1 | * | 5/2002 | Canady et al. | 710/2 |

* cited by examiner

Primary Examiner—Robert W. Beausoliel
Assistant Examiner—Emerson Puente
(74) Attorney, Agent, or Firm—Mattingly, Stanger, Malur & Brundidge, P.C.

(57) ABSTRACT

To reliably detect a failure even when the failure occurs at a part of a line or in a mating apparatus, a transmission control portion transmits a link-up signal for confirming connection by the mating apparatus to a transfer path during the period in which data is not transmitted, in accordance with the instruction from a line control portion. Receiving the link-up signal flowing through the transfer path, the reception control portion confirms that no failure exists in the mating apparatus and in the transfer path or in the apparatus, and sends this notice to the line control portion. When not receiving the link-up signal, the line control portion reports the failure to the mating apparatus by intentionally stopping transmission of the link-up signal through another transfer path. To examine the operation condition of the line, a specific signal that can be sent during the period in which the data is not transmitted, and represents whether or not the line is utilizable is used as the link-up signal.

9 Claims, 13 Drawing Sheets

FIG. 1
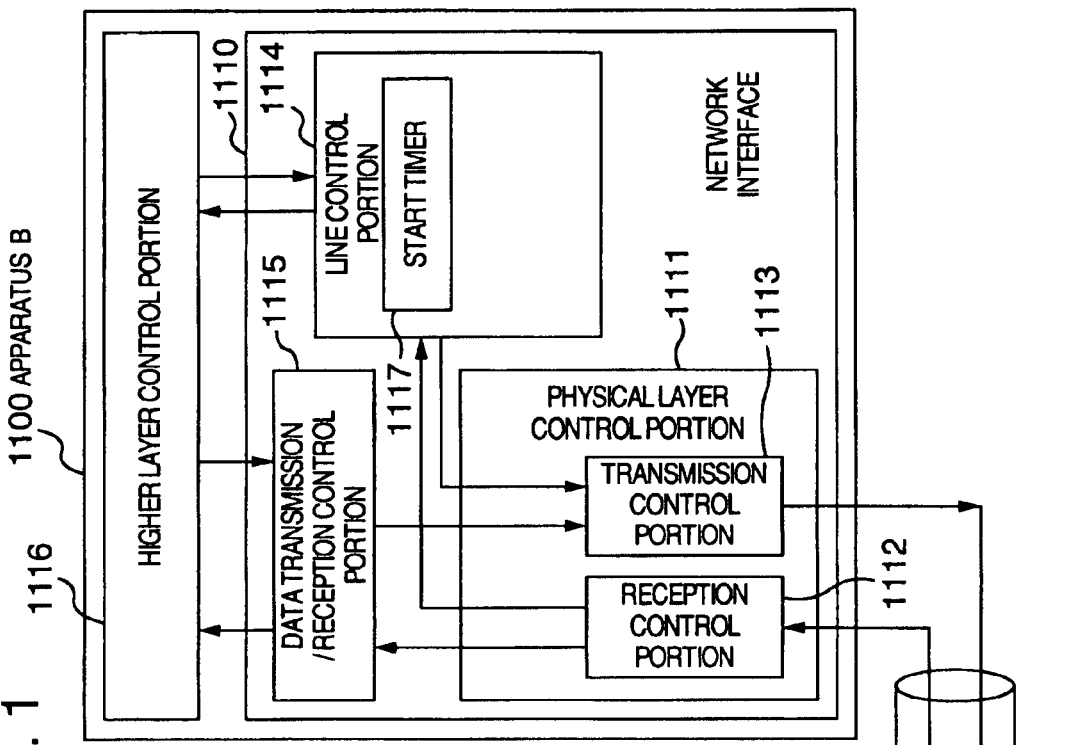
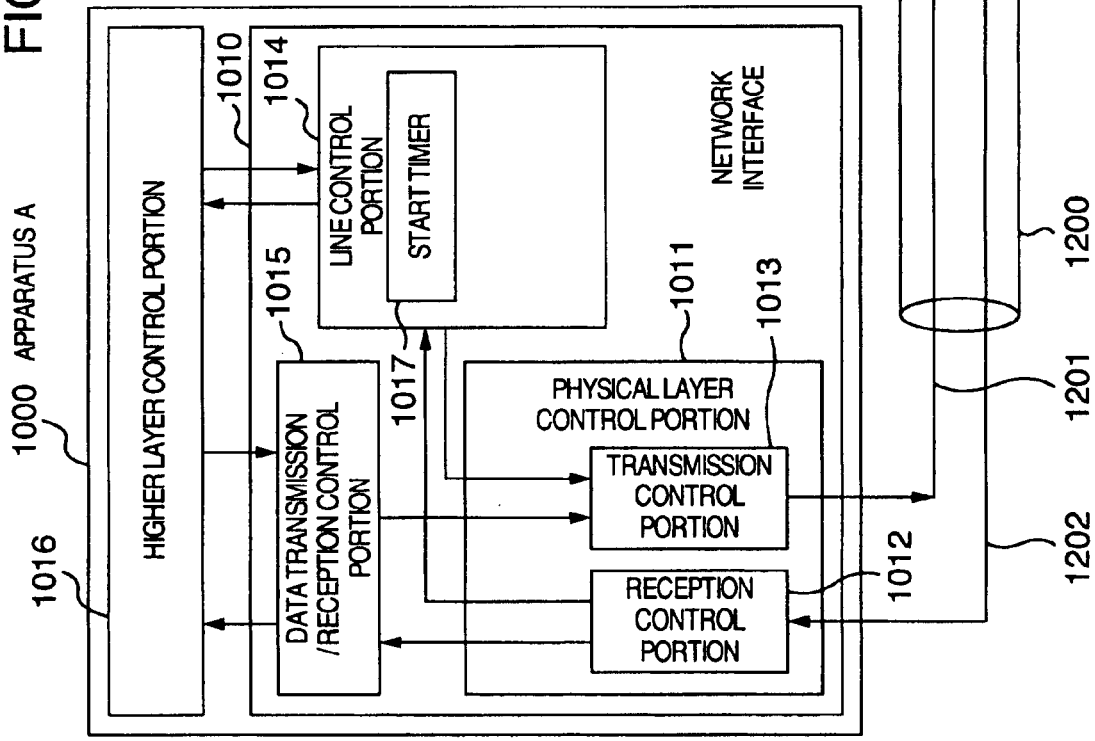

FIG. 13

| GROUP NO.<br>LINE CONTROL PORTION NO. | 1 | 2 | 3 | 4 | 5 | ○ ○ ○ |
|---|---|---|---|---|---|---|
| 1014 | ✕ | — | — | — | — | ○ ○ ○ |
| 1024 | △ | — | — | — | — | ○ ○ ○ |
| 1034 | — | ○ | — | — | — | ○ ○ ○ |
| 1044 | — | ○ | — | — | — | ○ ○ ○ |
| 1054 | — | ○ | — | — | — | ○ ○ ○ |
| 1064 | — | — | ○ | — | — | ○ ○ ○ |
| ⋮ | ⋮ | ⋮ | ⋮ | ⋮ | ⋮ | ⋮ |

—   NOT GROUP MEMBER
○   GROUP MEMBER, UNDER NORMAL OPERATION
✕   GROUP MEMBER, OPERATION STOP DUE TO FAILURE
△   GROUP MEMBER, OPERATION STOP DUE TO FAILURE IN OTHER LINE INSIDE GROUP

METHOD FOR SENDING NOTICE OF FAILURE DETECTION

BACKGROUND OF THE INVENTION

This invention relates to a method for sending a notice of failure detection. More particularly, this invention relates to a method for sending a notice of failure detection in a system wherein apparatuses A and B are connected by a pair of two independent transfer paths, that is, a transfer path for transmitting data from the apparatus A to the apparatus B and a transfer path for transmitting the data from the apparatus B to the apparatus A, and the data are communicated mutually between these two apparatuses.

In apparatuses for executing data communication by using twist-pair cables or optical fiber cables in accordance with the system stipulated by IEEE802.3 (IEEE: The Institute of Electrical and Electronics Engineers), two apparatuses are point-to-point connected by one cable. The term "apparatus" used hereby means an inter-network apparatus such as a computer, a hub accommodating therein a computer, a rooter, a LAN switch, and so forth. Let's consider, for example, a case where computers are accommodated in a network connection apparatus called "a LAN switch" by using twist-pair cables. When two apparatuses re called hereby the "apparatus A" and "apparatus B", the able that connects these apparatuses A and B includes a plurality of transfer paths. When the apparatuses A and B communicate with each other, the transfer path for transmitting data from the apparatus A to the apparatus B and the transfer path for receiving data by the apparatus A from the apparatus B are mutually independent transfer paths. A 10 Base-T technology, for example, uses the twist-pair cable. In this twist-pair cable, two conductors form a pair of transfer paths and a plurality of pairs are incorporated in one cable. One of the pairs is used for transmission and another pair, for reception. A technology called "100 Base-FX" uses an optical fiber cable. This optical fiber cable incorporates a plurality of optical fibers. One of the optical fibers is used for transmission, and another for reception.

The communication system described above has a setup for detecting whether or not the two apparatus connected by the cables are under the communicable condition. In other words, the apparatus A not only transmits data to the transfer path for transmitting the data to the apparatus B but transmits either periodically or steadily a specific signal different from the data during the period in which it does not transmit the data. On the other hand, the apparatus B always monitors the transfer path for receiving the data, detects the data or the specific signal different from the data transmitted from the apparatus A and thus confirms that data can be transmitted from the apparatus A to the apparatus B. A signal called "link pulse" is mainly used in the system using the twist-pair cable. In a system that uses the optical fiber cable, there is a method that utilizes an idle signal sent for reproducing the reception clocks. Receiving these signals, the apparatus B can know whether or not the apparatus A and the transfer path for transmitting the data from the apparatus A to the apparatus B operate normally. A similar processing is executed, too, on the transfer path for transmitting data from the apparatus B to the apparatus A. In consequence, it is possible to know that the transfer paths between the apparatus A and the apparatus B are connected correctly and that no failure occurs in the mating apparatus, hence the apparatuses A and B are under the communicable condition.

SUMMARY OF THE INVENTION

In the background art technologies, the apparatus A monitors the signals of a transfer path for receiving data transmitted from the apparatus B. Therefore, the apparatus A can know a failure of the transfer path for transmitting data from the apparatus B to the apparatus A when it detects the non-arrival of a signal from the apparatus B. However, the apparatus A cannot detect by itself a failure of the transfer path for transmitting data from the apparatus A to the apparatus B. IEEE802.3 defines, as "remote failure report function of auto-negotiation", means for reporting a failure to the apparatus A by modifying a signal to be sent to the transfer path for transmitting data to the apparatus A when the apparatus B detects the failure of the transfer path for receiving the data from the apparatus A. In connection with this failure report function, a technology called "100 Base-TX" defines the auto-negotiation function as an option and a technology called "1000 Base-X" defines the auto-negotiation function as a standard function but does not permit its invalidation. Therefore, the remote failure report function cannot be utilized always for all the apparatuses supporting these transmission technologies. Therefore, if a failure occurs in only the unidirectional transfer path in the transfer paths connecting the two apparatuses, there is no means for reliably detecting the failure so occurring by the apparatuses at both ends.

In view of the problems described above, an object of the present invention is to make it possible to detect reliably a failure even when the failure occurs at a part of a line or in a mating apparatus.

It is another object of the present invention to provide a method for sending a notice of failure detection that neither spoils mutual connectivity nor uses a new control protocol, but uses only existing technologies for examining the operation condition of the path as failure reporting means to the mating apparatus.

It is another object of the present invention to switch an operation stop condition to a normal operation condition by only transmission/reception of simple signals when the failure is restored.

It is still another object of the present invention to switch at a high speed and reliably the whole system by employing a dual system.

When a plurality of interfaces are grouped and incorporated inside an apparatus, it is a further object of the present invention to bring the operation into the operation stop condition for each group by only transmission/reception of simple signals when a failure is detected in another path inside the group or in the apparatus.

In the present invention, some signals are transmitted for confirming the connection condition of both apparatuses or transmitting clocks even when data is not transmitted through the transfer paths that connect two apparatuses. All the apparatuses support the function of monitoring signals transmitted to a transfer path on the reception side and detecting whether the reception side transfer path is under a state where it can execute the data transmission. Therefore, let's consider a case, for example, where the apparatus A detects the occurrence of a failure in a transfer path for receiving data from the apparatus B. At this time, the apparatus A intentionally stops sending all the signals to the transfer path for transmitting data to the apparatus B. On the other hand, the apparatus B judges that any failure occurs in the transfer path between the apparatus A and the apparatus B by detecting the non-arrival of all the signals from the apparatus A. As a result, both apparatuses can reliably detect the occurrence of the failure even when the failure occurs in only a unidirectional transfer path of the transfer paths that point-to-point connect the two apparatuses.

The present invention uses the function of examining whether or not the line operates normally, which function is supported by all the apparatuses when the failure is reported to the mating apparatus. Therefore, the present invention does not spoil mutual connectivity with existing apparatuses. Even when the present invention is applied, a specific control frame need not be exchanged between the apparatuses connected to each other. Therefore, a new protocol need not be prepared, either, and the present system can be accomplished merely by the simple operation.

When the apparatuses according to the present invention are employed to constitute a dual system, the whole system can be switched at a high speed and reliably even when any failure occurs at only a limited part of the lines between the apparatuses.

BRIEF DESCRIPTION OF THE DRAWINGS

FIG. 1 is a block diagram showing an example of an apparatus equipped with a line failure detection/reporting system according to the first embodiment of the present invention, and an example of a communication system using the apparatus;

FIG. 13 shows a structural example of a table of group storage means in the line failure detection/reporting system according to the second embodiment.

DESCRIPTION OF THE EMBODIMENTS

Figure 2:
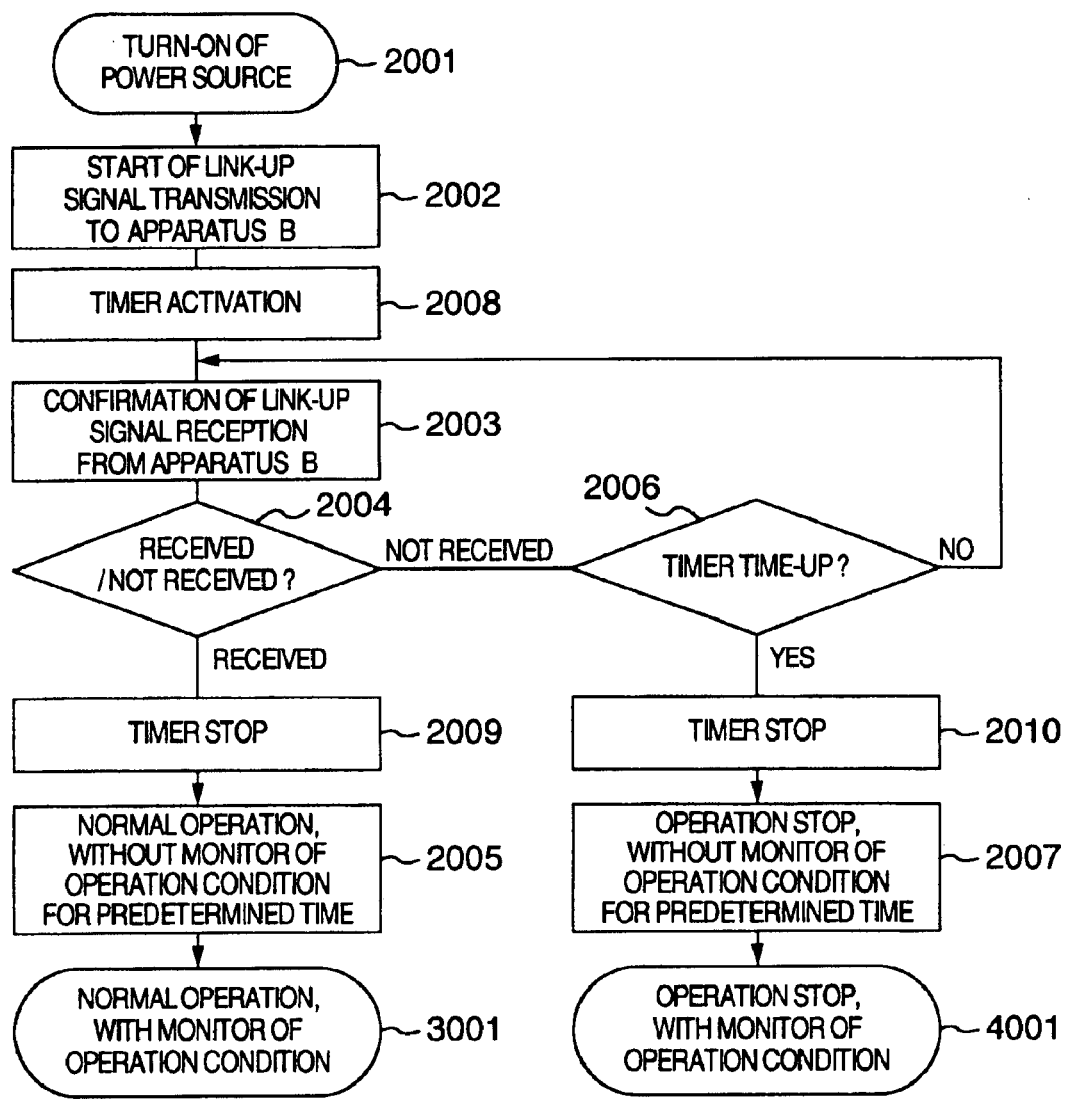
FIG. 2 is flowchart showing a processing flow of the apparatus equipped with the line failure detection/reporting system from turn-on of a power source of the apparatus to a normal operation start condition or an operation stop condition in the first embodiment.

The first embodiment of the present invention will be explained. In this embodiment, one cable incorporating a plurality of transfer paths connects two apparatus A and B, whereby the first transfer path transmits data from the apparatus A to the apparatus B and a second transfer path transmits data from the apparatus B to the apparatus A. Incidentally, these apparatuses may be inter-network apparatuses such as computers, hubs, rooters, LAN switches, and so forth.

To begin with, the construction of the apparatuses A and B will be explained with reference to FIG. 1. This drawing shows an example of an apparatus equipped with a line failure detection/reporting system according to the present invention and a communication system using the apparatuses. Each apparatus A1000 (B1100) includes a network interface 1010 (1110) and a higher layer control portion 1016 (1116). Each of these apparatuses A and B has at least one network interface and is connected with each other. FIG. 1 shows only one network interface among them that connects the apparatus A and B. The network interfaces 1010 and 1110 will be hereinafter called simply the "interface" 1010 and 1110. Each of these interfaces 1010 (1110) includes a data transmission/reception control portion 1015 (1115), a physical layer control portion 1011 (1111) and a circuit control portion 1014 (1114). The physical layer control portion 1011 (1111) includes a reception control portion 1012 (1112) and a transmission control portion 1013 (1113). The apparatuses A and B are connected mutually by a line 1200 that incorporates a first transfer path 1201 for transmitting data from the apparatus A to the apparatus B, and a second transfer path 1202 for transmitting data from the apparatus B to the apparatus A.

The function of the higher layer control portion 1016 (1116) may be selected appropriately depending on what kind of apparatuses the apparatus A1000 (B1100) is. When the apparatus A (B) is a computer, for example, the higher layer control portion 1016 (1116) has an arithmetic unit and storage means, and has a protocol control function for controlling the data transmission/reception to and from the interface 1010 (1110). When the apparatus A (B) is an inter-network apparatus, for example, the higher layer control portion 1016 (1116) has a relay engine, for example, and a function of relaying the data received from the interface 1010 (1116) to another interface. In either case, the higher layer control portion 1016 (1116) may have the functions of receiving a failure notice from the line control portion 1014 (1114) and executing a corresponding processing when a mating apparatus 1100 (1110) or a line 1200 that connects the higher layer control portion 1016 (1116) to the mating apparatus does not operate normally. The data transmission/reception control portion 1015 (1115) is interposed between the physical layer control portion 1011 (1111) and the higher layer control portion 1016 (1116) and controls the function that corresponds to a MAC (Media Access Control) layer.

A transmission control portion 1013 (1113) inside the physical layer control portion 1011 (1111) encodes the data it receives from the data transmission/reception control portion 1015 (1115) in accordance with the specification of the physical layer and then outputs the data to the line 1200. On the contrary, the reception control portion 1012 (1112) executes decoding of the signal it receives from the line 1200, in accordance with the specification of the physical layer and delivers the resulting data to the data transmission/reception control portion 1015 (1115). Depending on the property of the transfer path 1201 (1202), the transmission control portion 1013 (1113) has the function of sending the signals (various control signals) that are not the data, such as a signal for confirming connectivity with the transfer path 1201 on the mating apparatus side, a signal directed to send clocks used in the physical layer control portion 1111 of the mating apparatus, etc., in accordance with the instruction of the circuit control portion 1014 (1114) during the period in which the data is not sent. The reception control portion 1012 (1112) has the functions of confirming utilizability of the transfer path, the apparatus by receiving the signal for confirming connectivity and the signal for sending the clocks flowing the transfer path 1202, confirming connectivity with the mating apparatus, the existence/absence of a failure in the transfer path or in the apparatus, and reporting the confirmation result to the line control portion 1014 (1114). In the 10 Base-T technology that uses a twist-pair cable for the line 1200, for example, the signal (control signal) described above, that is not the data, corresponds to a link pulse. In the technology called "100 Base-FX" that uses an optical fiber for the line 1200, the signal (control signal) that is not the data corresponds to idle signals that are continuously transmitted during the period in which the data is not transmitted.

Hereinafter, all the signals that can be used for confirming the connectivity with the mating apparatus and the absence of a failure of the transfer path or the apparatus and representing whether or not the transfer paths, apparatuses and the system are utilizable, and that are not the data, such as the link pulse, and the idle signals and the data signals will be generically called the "link-up signal". The "link-up signal" is not always the signal that is transmitted in order to confirm connectivity with the mating apparatus, but includes those signals which can confirm connectivity when the data is sent, such as the data signal. The state under which the link-up signal is not detected represents the state where the signals representing utilizability, such as the signal capable of confirming connectivity with the mating apparatus, are not at all received. Such a signal follows the IEEE 802.3 Standard when the 10 Base-T technology or the 100 Base-FX technology is utilized.

The line control portion 1014 (or 1114) has the functions of receiving the connectivity confirmation information with the mating apparatus from the reception control portion 1012 (1112) and giving the instruction to transmit the signal for confirming connectivity to the transfer path 1201 (1202) on the side of the mating apparatus and the clocks used in the physical layer control portion 1111 (1022) of the mating apparatus to the transmitting control portion 1013 (1113).

In the embodiment, the explanation will be given on only the case where the interface 101 of the apparatus A10000 is connected to the interface 1110 of the apparatus B1100 by the line 1200 and data communication is executed, but the present invention is not limited to such a case. The operations of the interfaces of the apparatuses A1000 and B1000 other than the operation described above are not limited in this embodiment. In other words, the same processing as that of the present embodiment, or other processing, may be executed.

Next, the procedure for detecting a failure of the line 1200 by the apparatus A1000 (B1100) will be explained.

First, the procedure of turn-on of the power source from the condition where the power sources of both apparatuses are cut off will be explained with reference to FIG. 2. This flowchart shows step-wise the processing sequence from turn-on of the power sources of the apparatuses to the normal operation start condition or to the normal operation stop condition in the line failure detection/reporting system of the present invention. In this case, since the apparatus A and the apparatus B operate in exactly the same way, only the operation of the apparatus A1000 will be explained as a representative example in FIG. 2.

First, when the power source is turned on (Step 2001), the line control portion 1014 instructs the transmission control portion 1013 of the physical layer control portion 1011 to transmit the link-up signal to the connecting mating apparatus B1100. Receiving this instruction, the transmission control portion 1013 starts transmitting the link-up signal to the connecting mating apparatus B1100 (Step 2002). The line control portion 1014 then activates a start timer 1017 that monitors a predetermined period of time (Step 2008). This start timer 1017 is used to judge whether or not a predetermined time has passed from the start of the processing. A certain predetermined value is set as an initial value to this timer 1017 and when a subtraction value reaches "0" with the lapse of time, the time is regarded as ending up. The initial value is the time necessary for the apparatus to become able to start the data communication after the power source of the apparatus is turned on and the necessary preparation is completed, such as 10 or 30 seconds, or up to about 1 minute depending on the apparatus. Next, the line control portion 1014 examines the condition of the reception control portion 1012 of the physical layer control portion 1011, and confirms whether or not the link-up signal is received from the transfer path 1202 (Step 2003).

Next, the following judgment is made in accordance with the result of Step 2003 (Step 2004). When the link-up signal is received, this reception is notified to the line control portion 1014. Judging that the preparation for transmitting and receiving the data is ready in the interface 1110 of the mating apparatus B1100 and in the line 1200, the line control portion 1014 stops the start timer 1017 activated in Step 2008 (Step 2009). The interface 1010 then enters the normal operation condition (Step 2005). However, monitor of the later-appearing operation condition is not yet conducted at this point of time. After the passage of the predetermined time, the monitor operation is started to monitor the normal operation condition (Step 3001). This predetermined time is called hereby the "insensitive time", and the reason why this insensitive time is necessary will be explained later.

If the link-up signal is not yet received in Step 2004, the flow proceeds to next Step 2006 as the preparation is not ready. In this Step 2006, whether or not the time of the start timer 1017 activated in Step 2008 is up is checked. When the time is up, the preparation of the interface 1110 of the mating apparatus B1100 or the preparation of the line 1200 is judged as being not yet completed even though a sufficient time has passed. The start timer activated in Step 2008 is stopped (Step 2009), and the interface 101 enters the operation stop condition (Step 2007). However, monitor of the later-appearing operation condition is not yet conducted at this point in Step 2007. After the passage of the predetermined time, monitor of the operation condition is executed even in the operation stop mode (Step 4001). This predetermined time is equal to the insensitive time described above. When the start timer 1017 activated in Step 2008 does not yet fully count up in Step 2006, the flow returns to Step 2003 because a sufficient time does not yet pass from the start of the processing, and the process steps described so far are repeated.

As described above, even when the link-up signal is not received from the reception control portion 1012 (1112) at the time of making of power, the transmission control portion 1014 (1113) keeps transmitting the link-up signal for a predetermined time. In this way, the normal operation can be executed as soon as the preparation of the mating apparatus 1100 (1000) and the line 1200 becomes ready.

Figure 3:
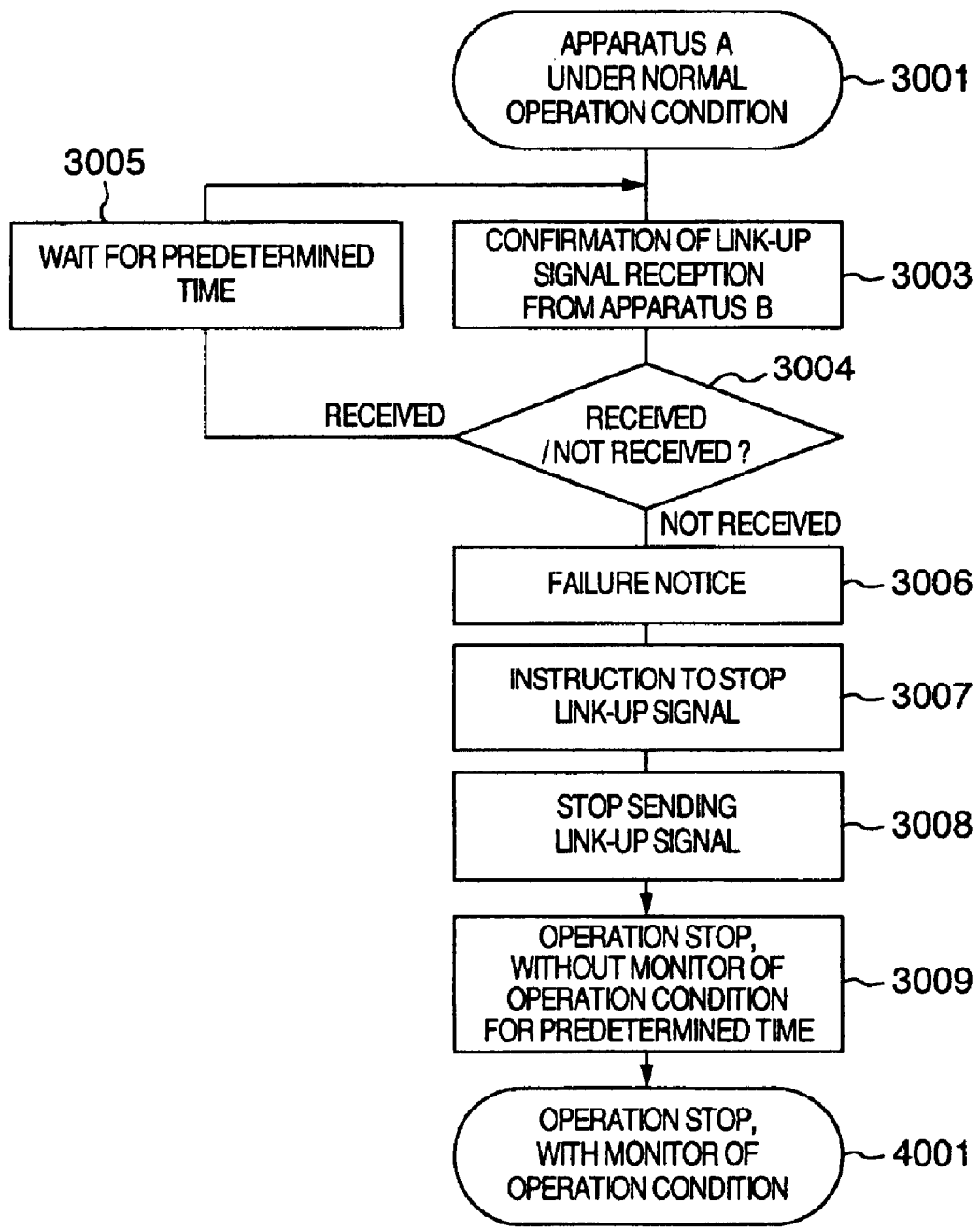
FIG. 3 is a flowchart showing a processing flow of the apparatus equipped with the line failure detection/reporting system from the normal operation start condition to the operation stop condition upon detecting a failure.

Referring next to FIG. 3, the explanation will be given on the failure detection procedure when any failure occurs in the transfer path 1202 for transmitting the data from the apparatus B1100 to the apparatus A1000 or in the transmission control portion 1113 of the apparatus B1100 and data communication becomes infeasible after both apparatuses A and B start operating normally. FIG. 3 shows an example of the processing procedure from the start of the normal operation to the operation stop condition as a failure is detected. The drawing shows the processing procedure of only the apparatus A1000 because both apparatuses A1000 and B1100 have originally the same function, and the processing procedure of the apparatus B1100 is the same as that of the apparatus A1000.

First, the explanation will be given from the point of time at which the apparatus A1000 enters the normal operation condition (Step 3001 in FIGS. 2 and 3). After this Step 3001, the line control portion 1014 checks the condition of the reception control portion 1012 of the physical layer control portion 1011, and confirms whether or not the link-up signal is received through the transfer path 1202 (Step 3003). Next judgment is made in accordance with the result of Step 3003 (Step 3004). In other words, when the link-up signal is received, the line control portion 1014 judges that the interface 1110 of the mating apparatus B1100 and the line 1200 can consecutively transfer the data, and after the passage of a predetermined time (Step 3005), returns to Step 3003.

When the link-up signal is not yet received in Step 3004, the line control portion 1014 judges that any failure occurs in the interface 1110 of the mating apparatus B1100 and in the line 1200 and the data communication cannot be continued, and switches the processing to Step 3006. In this Step 3006, the reception control portion 1012 notifies the line control portion 1014 that it cannot receive the link-up signal any longer (or the line control portion 1014 judges the failure of the data communication from the condition of the reception control portion 1012). Receiving this notice, the line control portion 1014 instructs the transmission control portion 1013 to stop sending the link-up signal (Step 3007). The transmission control portion 1013 stops sending the link-up signal. In consequence, the interface 1010 of the apparatus A1000 enters the operation stop condition (Step 3009). In Step 3009, however, monitor of the later-appearing condition is not yet conducted at this point of time. This monitor condition of the operating condition is then entered after the passage of the predetermined time, although the mode is under the operation stop condition (Step 4001). This predetermined time is equal to the insensitive time described above.

In Step 3005, the reason why it is necessary to wait for the predetermined time is as follows. The link-up signal is the signal that is periodically transmitted from the transmission control portion 1113, and a predetermined time is necessary before the reception control portion 1012 detects the state where these link-up signals are no longer received. The 10 Base-T technology using the twist-pair cable, for example, stipulates this predetermined time as 50 to 150 milliseconds. Therefore, if the loop of Steps 3003, 3004 and 3005 can be executed within a sufficiently shorter time than this time such as about 10 msec, it is possible to detect instantaneously that the link-up signal is no longer detected. Therefore, the loop need not be executed at a higher speed.

On the other hand, the apparatus B1100, too, executes the same processing as that of the apparatus A. The apparatus B1100 cannot directly detect the failure of the transfer path 1202. However, it can detect eventually the failure of the transfer path 1202 as the apparatus A1000 detects the failure of the transfer path 1202 and stops sending the link-up signal to the transfer path 1201. Consequently, the interface 1110 of the apparatus B enters the operation stop condition.

When the apparatus A (or the apparatus B) detects the occurrence of the failure in one of the transfer paths 1202 (1201) as described above, the apparatus A (B) compulsively stops sending the link-up signal to be sent to the other transfer path 1201 (1202). In consequence, the interfaces 1010 and 1110 of both apparatuses A1000 and B1100 can detect the failure when any failure occurs even at a part of the line 1200. When the cause of the failure is thereafter removed and the operation can restore the normal operation, the operation restores the normal operation either automatically, or manually through an operator, depending on the operation method of the apparatus. The explanation will be given first on the procedure of the automatic restoration.

Figure 4:
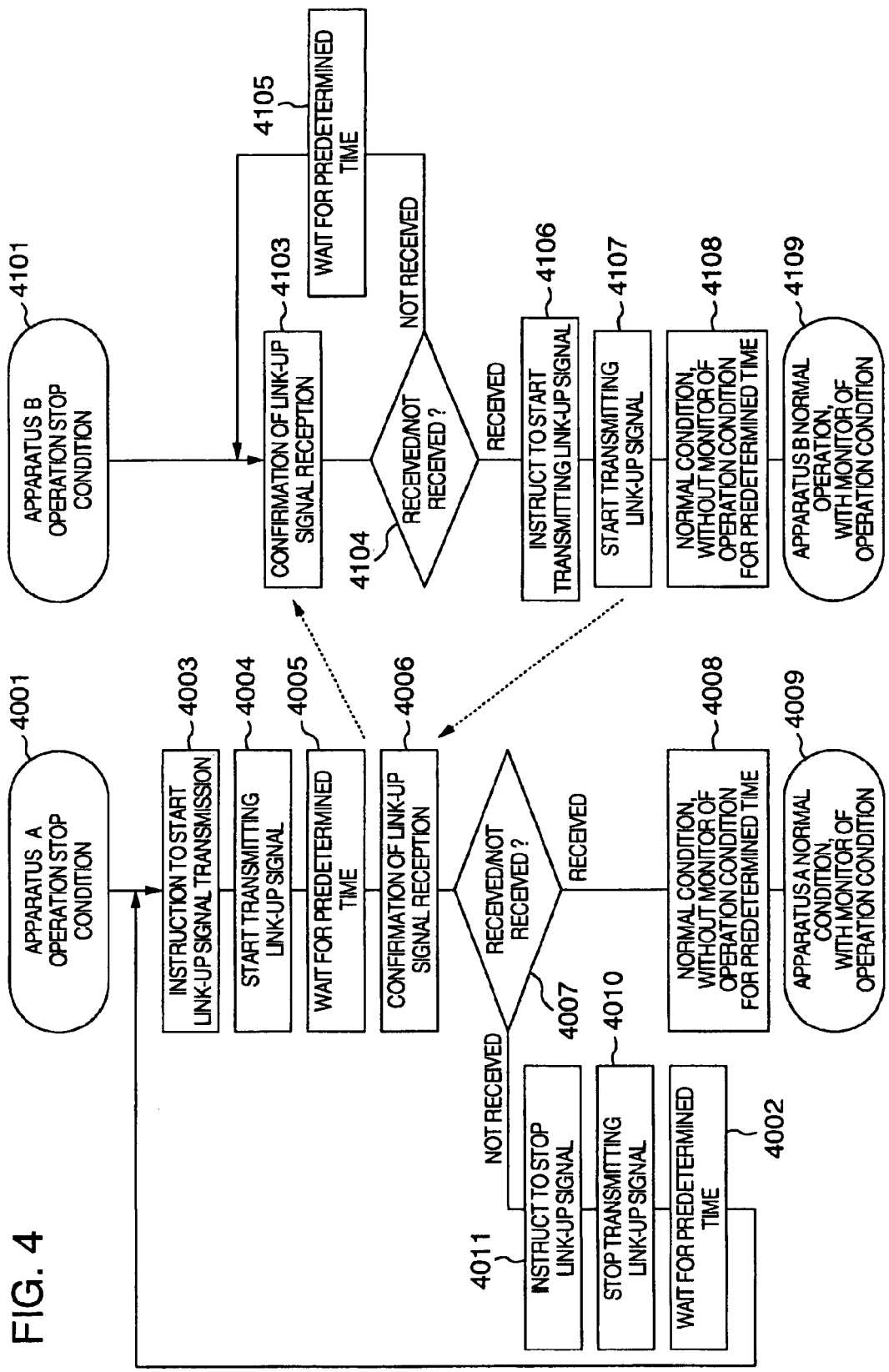
FIG. 4 is a flowchart showing a processing flow of the apparatus equipped with the line failure detection/reporting apparatus from the operation stop condition to the normal operation start condition.

The processing procedure when the apparatuses A1000 and B1100 are so set as to achieve the automatic restoration will be explained with reference to FIG. 4. The drawing is a flowchart showing an example of the processing procedure from the operation stop condition to the normal operation start condition in the line failure detection/reporting system according to the present invention. First, it will be assumed that both Step 4001 of the apparatus A and Step 4101 of the apparatus B reach the operation stop condition of Step 4001 as a result of the processing shown in FIG. 2 or the operation stop condition of Step 4001 as a result of the processing shown in FIG. 3.

In the apparatus A, first of all, the line control portion 1014 instructs the transmission control portion 1013 of the physical layer control portion 1011 to start transmission of the link-up signal after Step 4001 (Step 4003). The transmission control portion 1013 starts transmitting the link-up signal in accordance the instruction (Step 4004). Thereafter, the passage of the predetermined time is waited again (Step 4005). This predetermined time is equal to the insensitive time described above. The line control portion 1014 examines the condition of the reception control portion 1012, and confirms whether or not it receives the link-up signal from the transfer path 1202 (Step 4006).

Next, the following judgment is made in accordance with the result of Step 4006 (Step 4007). When the link-up signal is received, a failure that has occurred in the interface 1110 of the mating apparatus B1100 or in the line 1200 is judged as being solved and the operation is judged as returning to the normal condition where the data communication can be made, and the apparatus A then returns to the normal operation condition (Step 4008). This Step 4008 is the same as Step 2005 shown in FIG. 2. After the passage of the insensitive time, the flow proceeds to Step 4009 (that is the same as Step 3001 in FIG. 2).

When the link-up signal is not received in Step 4007, the failure that has occurred in either the interface 1110 of the mating apparatus B1100 or the line 1200 is judged as being not yet solved and the data communication is judged as being impossible. Therefore, the flow proceeds to Step 4011. In this Step 4011, the circuit control portion 1014 instructs the transmission control portion 103 to stop sending the link-up signal. In consequence, the transmission control portion 1013 stops transmitting the link-up signal (Step 4010). After the passage of a predetermined time (Step 4002), the flow returns to Step 4003. This predetermined time is equal to the insensitive time described above.

The apparatus B1100 executes the following processing in parallel with the processing of the apparatus A1000. First, the circuit control portion 1114 examines the condition of the reception control portion 1112, and confirms whether or not it receives the link-up signal from the transfer path 1201 (Step 4103). The following judgment is then made in accordance with the result of Step 4103 (Step 4104). When the link-up signal is received, the failure that has occurred in either the interface 1010 of the mating apparatus A1000 or the line 1200 is judged as being solved and the operation condition is judged as restored to the normal condition where the data communication can be made. The flow proceeds to Step 4106. In this Step 4106, the line control portion 1114 instructs the transmission control portion 1114 to start sending the link-up signal. The transmission control portion 1113 starts transmitting the link-up signal in accordance with this instruction (step 4107). The interface 1110 of the apparatus B returns to the normal operation condition (Step 4108). Step 4108 is the same as Step 2005 in FIG. 2. After the passage of the insensitive time, the flow proceeds to Step 4109 (that is the same as Step 3001 in FIG. 2).

When the link-up signal is not received in Step 4104, the failure that has occurred in either the interface 1010 of the mating apparatus A1000 or the line 1200 remains unsolved and the data communication is judged as being not yet possible, the flow proceeds to Step 4105. After the passage of a predetermined time in Step 4105, the flow proceeds to Step 4103. The reason why the predetermined time is necessary is as follows. The link-up signal is the signal that is periodically transmitted from the transmission control portion 1013 (1113), and a predetermined time is necessary before the link-up signal is detected from the condition where the link-up signal is not detected in the reception control portion 1012 (1112) to the condition where the link-up signal is detected. In the 10 Base-T technology using the twist-pair cables, for example, a time of 24 to 72 milliseconds or so is necessary. Therefore, if the loop of the processing 4103, 4104 and 4105 can be executed within a sufficiently shorter period of time than this time, such as about 10 msec, it is possible to know instantaneously the detection of the link-up signal. This loop need not be executed at a higher speed.

The explanation given above explains the processing flow starting from Step 4001 in the apparatus A2000 and the processing flow starting from Step 4101 in the apparatus B1100. However, both of these flows should be executed in both apparatuses A1000 and B1000. The processing flow that starts from Step 4001 and transmits spontaneously the link-up signal to confirm the condition of the mating apparatus is executed with a predetermined cycle. This cycle is longer than the cycle that is determined by Step 4002 and the insensitive time of Step 4005, but is a time sufficient to detect quickly elimination of the line failure. In the 10 Base-T technology using the twist-pair cables, for example, this time is believed to be preferably about 0.3 to 0.5 seconds or so. When the cycle is longer than this time, the detection is retarded even when the line failure is solved, and the time necessary for restoring the normal communication becomes longer.

The processing that starts from Step 4101 and confirms periodically whether or not the link-up signal, too, is received is executed with a predetermined cycle. This cycle is longer than the cycle that is determined by the insensitive time of Step 4102 and the wait time of Step 4105, and is the time sufficient to detect quickly elimination of the line failure. In the 10 Base-T technology using the twist-pair cables, for example, this cycle is believed preferably from about 0.3 to about 0.5 seconds or so. When the cycle is longer than this value, the detection is retarded even when the line failure is solved, and the time necessary for restoring the normal communication becomes longer. When these two systems of processing are executed in parallel, the restoration from the failure can be detected quickly and the normal operation condition can be restored.

Figure 7:
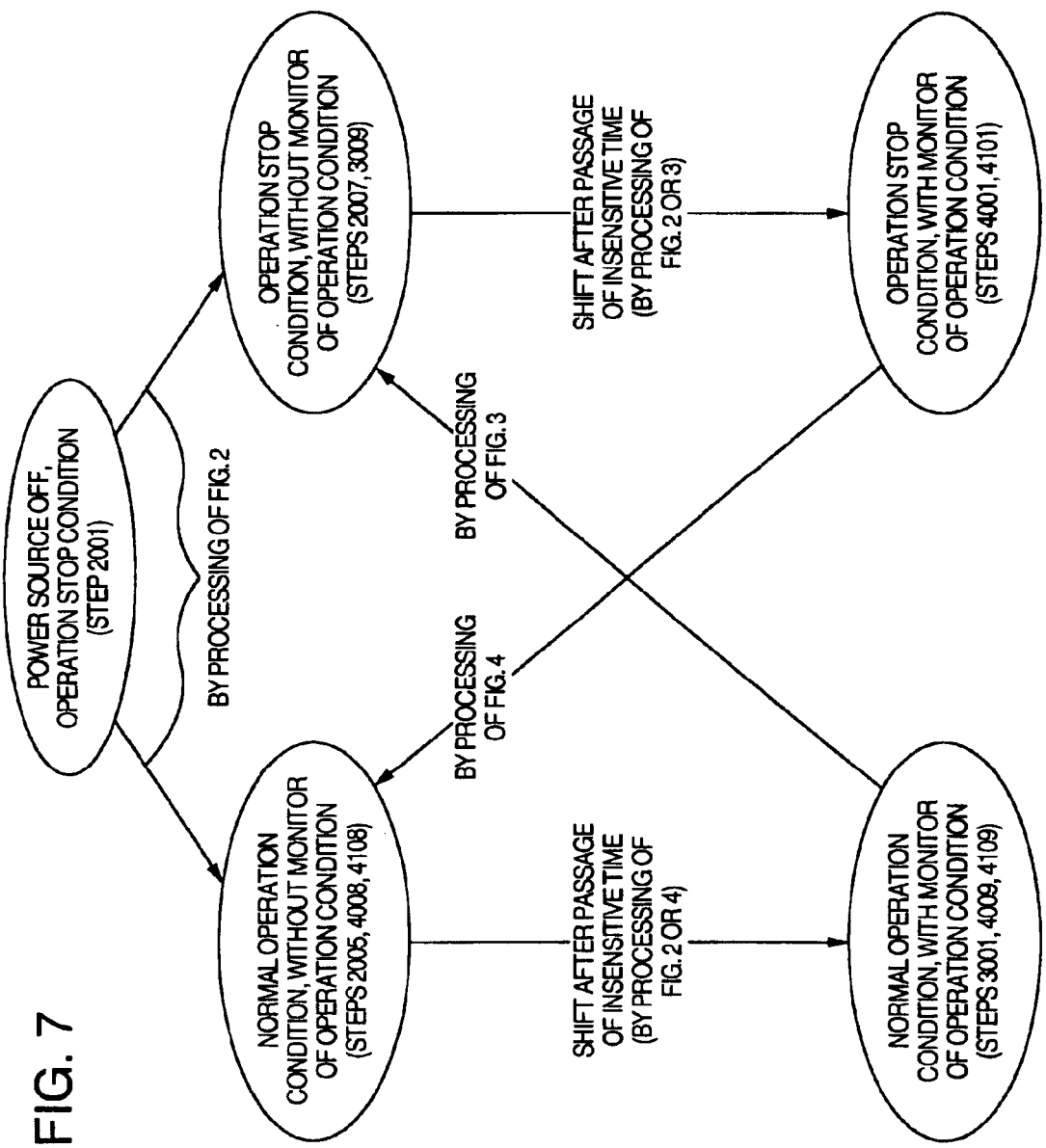
FIG. 7 is a diagram showing an example of the condition shift of an interface using the line failure detection/reporting system according to the first embodiment.

FIG. 7 is a diagram showing an example of the state shift of the interfaces by the line failure detection/reporting system of the first embodiment. This diagram shows the state shift of the interface 1010 of the apparatus A1000 and the interface 1110 of the apparatus B1100 explained with reference to FIGS. 2 to 4.

FIG. 7 shows the state shift from "power source OFF, operation stop condition" to "normal operation condition, with monitor of operation condition" through the "normal operation condition, without monitor of operation condition", and the state shift from "power source OFF, operation stop condition" to "operation stop condition, with monitor of operation condition" through "operation stop condition, without monitor of operation condition" by the processing shown in FIG. 2. FIG. 7 shows also the state shift from "normal operation condition, with monitor of operation condition" to "operation stop condition, with monitor of operation condition" through "operation state condition, without monitor of operation condition" by the processing shown in FIG. 3. FIG. 7 shows further the state shift from "operation stop condition, with monitor of operation condition" to "normal operation condition, with monitor of operation condition" through "normal operation condition, without monitor of operation condition" by the processing shown in FIG. 4.

The reasons why the insensitive time described above is necessary will be hereby explained. It will be assumed that both apparatuses A1000 and B1100 are under the operation stop condition where the data communication cannot be made, and both apparatus return from this state to the normal operation condition with the transmission of the link-up signal by the interface 1010 of the apparatus A as being the trigger. This state is shown in FIG. 4. First, the transmission control portion 1013 transmits the link-up signal in accordance with the instruction of the line control portion 1014 of the apparatus A1000. The reception control portion 1113 of the apparatus B1010 receives this link-up signal through the transfer path 1201, and the line control portion 1114 recognizes the link-up signal reception. In contrast, the line control portion 1114 of the apparatus B1100 instructs the transmission control portion 1123 to transmit the link-up signal, and the transmission control portion 1113 transmits the link-up signal. The reception control portion 1012 of the apparatus A1000 receives this link-up signal through the transfer path 1202, and the line control portion 1014 recognizes the reception of the link-up signal. Both apparatuses can restore the normal operation condition after the processing described so far is completed. The reception control portion 1012 (1112) needs the time before it starts receiving the link-up signal and recognizes that the transfer path becomes utilizable.

In the 10 Base-T technology using the twist-pair cable, for example, a pulse called "link pulse" is transmitted in an interval of 16±8 milliseconds during the period in which the data transfer is not executed. It is thus possible to recognize that the transfer path is utilizable, so long as this pulse is steadily received. Therefore, in the restoration sequence described above, the cycle in which the transmission control portion 1012 of the apparatus A1000 transmits the link-up signal and the reception control portion 1013 of the apparatus A1000 receives is maximum about 50 milliseconds. Therefore, when Step 4006 in FIG. 4 is executed immediately after the apparatus A1000 transmits the link-up signal in Step 4004, reaction from the apparatus B1100 is not in time. Consequently, the apparatus A judges that the data communication is not yet ready and stops transmitting the link-up signal with the result that both apparatuses cannot restore the normal operation condition. If latency corresponding to the insensitive time is provided after Step 4004 and then Step 4006 is executed, the apparatus B1100 can recognize the link-up signal and can react with this signal well before the reception recognition processing of the apparatus A1000, and both apparatuses can restore the normal operation condition.

When the operation comes at halt due to the occurrence of any failure under the normal operation condition of both apparatuses A1000 and B1100, this insensitive time need not be disposed originally. This is the case, for example, where the cable that connects the apparatus A1000 to the apparatus B1010 is cut off and the signal cannot be exchanged. For, one of the transfer paths does not pass the link-up signal due to the occurrence of the failure and both apparatuses are under the operation stop condition. When it is desired to bring the system into the compulsive operation stop condition for some reason or other, the operation stop condition cannot be achieved in some cases unless this insensitive time is disposed in the same way as described above. Let's assume, for example, a case where the line is temporarily brought down for maintenance. Assuming in this case that the apparatus A1000 is under the condition of "normal operation condition, with monitor of operation condition (Step 3001)" of the state shift diagram shown in FIG. 7 and the line is intentionally brought down to achieve the operation stop condition, the apparatus A1000 enters first the condition of "operation stop condition, without monitor of operation condition (Step 3009)". It will be further assumed that setting is made at this time so that the insensitive time of the apparatus A is "0" and the apparatus A instantaneously shifts to "operation stop condition, with monitor of operation condition (Step 4001)", monitors the condition of the line and automatically restores the normal condition. As explained above, it needs time before the mating apparatus B1100 completely reaches the operation stop condition, and the apparatus A1000 is likely to wrongly recognize that the apparatus B re-starts the operation, and starts again its operation. In other words, there is the possibility that the apparatus A1000 oscillates in the loop of Step 3001→Step 3009→Step 4001→Step 4008→Step 3001 in the state shift diagram shown in FIG. 7. The insensitive time is set to prevent such an oscillation.

As described above, the transmission control portions 1013 and 1113 of both apparatuses transmit periodically the link-up signal in the predetermined cycle. If the transmission controller 1113 and 1013 of both apparatuses transmit the link-up signal in response to the link-up signal described above, both apparatuses return to the normal operation condition as the failure is judged as being eliminated.

When the normal operation condition is restored manually but not automatically after the cause of the failure is eliminated, it may be possible to employ a method that executes the same processing as that of making of power shown in FIG. 2. Alternatively, a process similar to the automatic restoration shown in FIG. 4 may be employed. Both apparatuses A and B cannot always restore the operation condition at the same timing but a certain time lag occurs between them depending on the operation condition. However, the normal restoration can be achieved by either of the methods described above. When the processing similar to that of making of power is executed, the time-up time of the start timers 1017 and 1117 may be equal to the start of the processing of making of power, or a time including a time lag of the operation time of two apparatuses that an operator may be set separately.

Next, the second embodiment of the present invention will be explained. In the second embodiment, a dual network system is constituted by using the apparatuses equipped with the line failure detection/reporting system of the present invention explained in the first embodiment so that the operation can be continued by cutting off a failure portion when such a failure occurs.

First, the construction of the apparatuses used in the system of this embodiment will be explained with reference to FIG. 6. The drawing shows an example of the apparatus equipped with the line failure detection/reporting system according to the present invention. The term "apparatus" used herein represents an inter-network apparatus such as a hub incorporating a computer, a rooter, a LAN switch, and so forth, in the same way as in the first embodiment.

Figure 6:
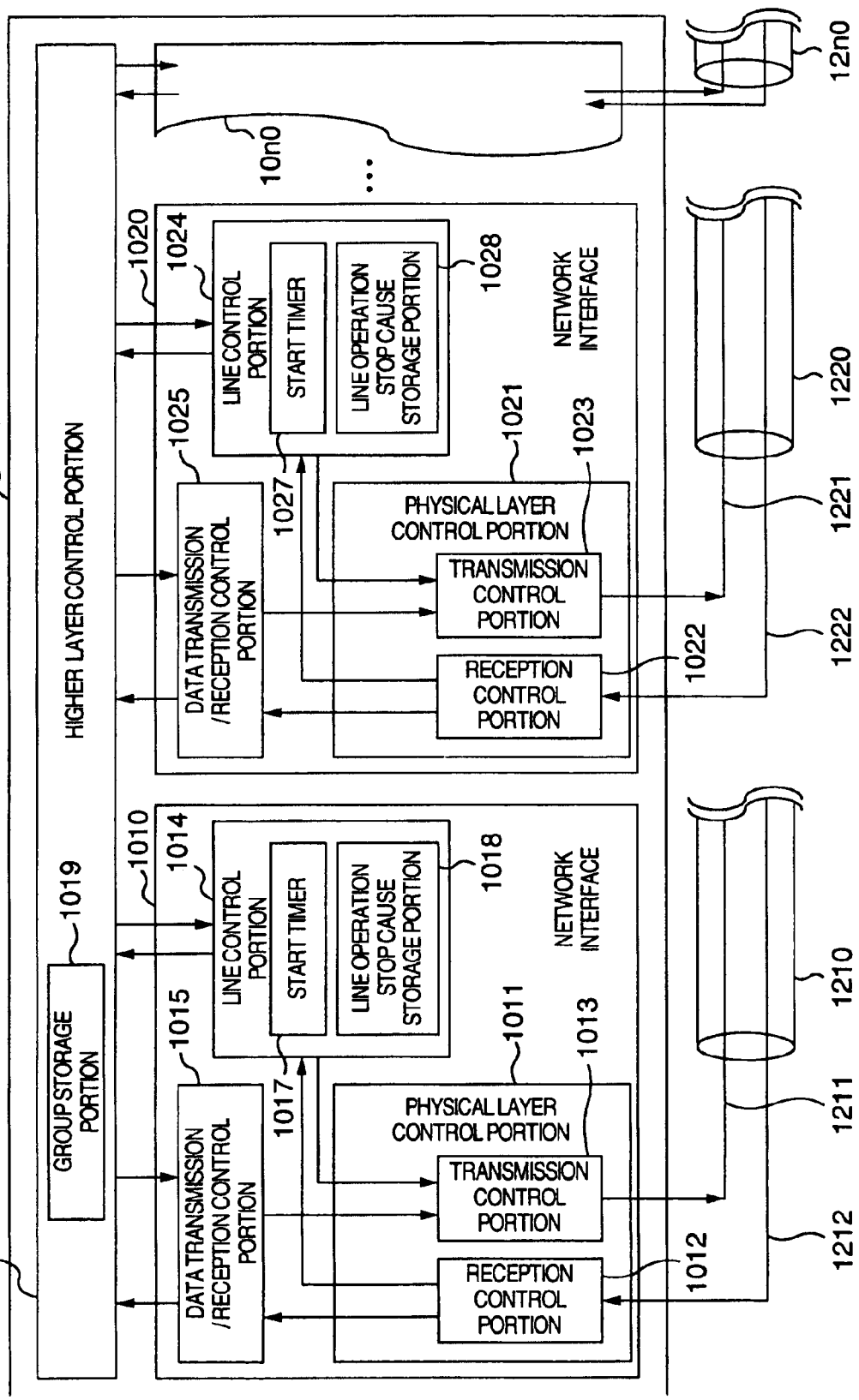
FIG. 6 is a block diagram showing a structural example of an apparatus equipped with the line failure detection/reporting system according to the second embodiment.

The structural example of the apparatus shown in FIG. 6 has all the functions of the apparatus A1000 used for explaining the first embodiment with reference to FIG. 1, and includes the following three additional functions.

The first is that the apparatus has n (n: integer more than 1) network interfaces (network interfaces 1010, 1020, . . . , 10n0). The apparatus shown in FIG. 1 has at least one network interface but in this embodiment, the apparatus shown in FIG. 6 has n network interfaces. Incidentally, FIG. 6 shows only two network interfaces for ease of explanation but it has practically n network interfaces. The individual network interfaces 1010, 1020, . . . , 10n0 are connected to separate apparatuses through lines 1210, 1220, . . . , 12n0, respectively.

The second is that each line control portion 1014, 1024 has line operation stop cause storage means 1018, 1028. Each line operation stop cause storage means 1018, 1028 is means for storing the cause of the stop of the operation when the operation of the line 1210, 1220 controlled by its own network interface 1010, 1020 stops.

The third is that the higher layer control portion 1016 includes group storage means 1019 for grouping a set of an interface 1010, 1020, . . . , 10n0 accommodated in its own apparatus and a line 1210, 1220, . . . , 10n0 and storing the set. Since the apparatus shown in FIG. 6 accommodates n (n: integer) interfaces and lines, for example, the first and second interfaces 1010, 1020/lines 1210, 1220 are assumed to belong to the first group, the third to fifth interfaces 1030 to 1050/lines 1230 to 1250, to the second group, and the sixth to n-th interfaces 1060 to 10n0/lines 1260 to 12n0, to the third group. It will be assumed hereby that each interface belongs to at least one group and at least one interface belonging to each group exists. A single interface may belong to a plurality of groups, too. The group storage means 1019 stores, for each group, which interfaces belong to each group and stores also the operation condition of each interface.

FIG. 13 shows a table structural example of the group storage means 1019. Incidentally, the network interfaces 1010 and 1020 will be hereinafter called merely the "interfaces 1010 and 1020", in this embodiment, too. The term "link-up signal" will be used in the same meaning as used in the first embodiment. This example represents to which group the line control portions 1014, 1024, ..., 10n4 belong. Symbol "-" represents that the line control member is not the group member. Symbol "○" represents that the line control portion is the group member and is under the normal operation condition. Symbol "X" represents that the line control portion is the group member and is under the operation stop condition due to the failure. Symbol "Δ" represents that the line control portion is the group member but is under the operation stop condition due to the line failure in other groups. For example, the line control portions 1034, 1044 and 1054 belong as the group member to the group 2 and are under the normal operation condition. The line control portions 1014 and 1024 belong as the group member to the group 1. However, the line control portion 1014 is under the operation stop condition due to the failure, and the line control portion 1024 is under the normal operation condition.

In each interface 1010, 1020 of the apparatus 1000 shown in FIG. 6, the processing procedure at the time of making of power is exactly the same as that of the first embodiment. As to the failure occurring in the line 1210 or 1220 directly coupled with each interface 1010 or 1020, the differences of the processing procedure from the detection of the line failure under the normal operation condition to the operation stop condition, and the processing procedure from the detection of the recovery of the failure under the operation stop condition to the restoration to the normal operation condition, from those of the first embodiment, will be mainly explained. The explanation will be given about the interface 1010 with reference to FIGS. 4, 9, 10, 11 and 12.

First, the processing from the detection of a line failure under the normal operation condition to the operation stop condition will be explained. It will be assumed that a failure occurs in the transfer path 1212 connected to the interface 1010 from the state where the interface 1020/line 1220 belonging to the same group as at least the interface 1010/line 1210 and the line 1210 among the interface/line connected to the apparatus 1000 operate normally.

Figure 9:
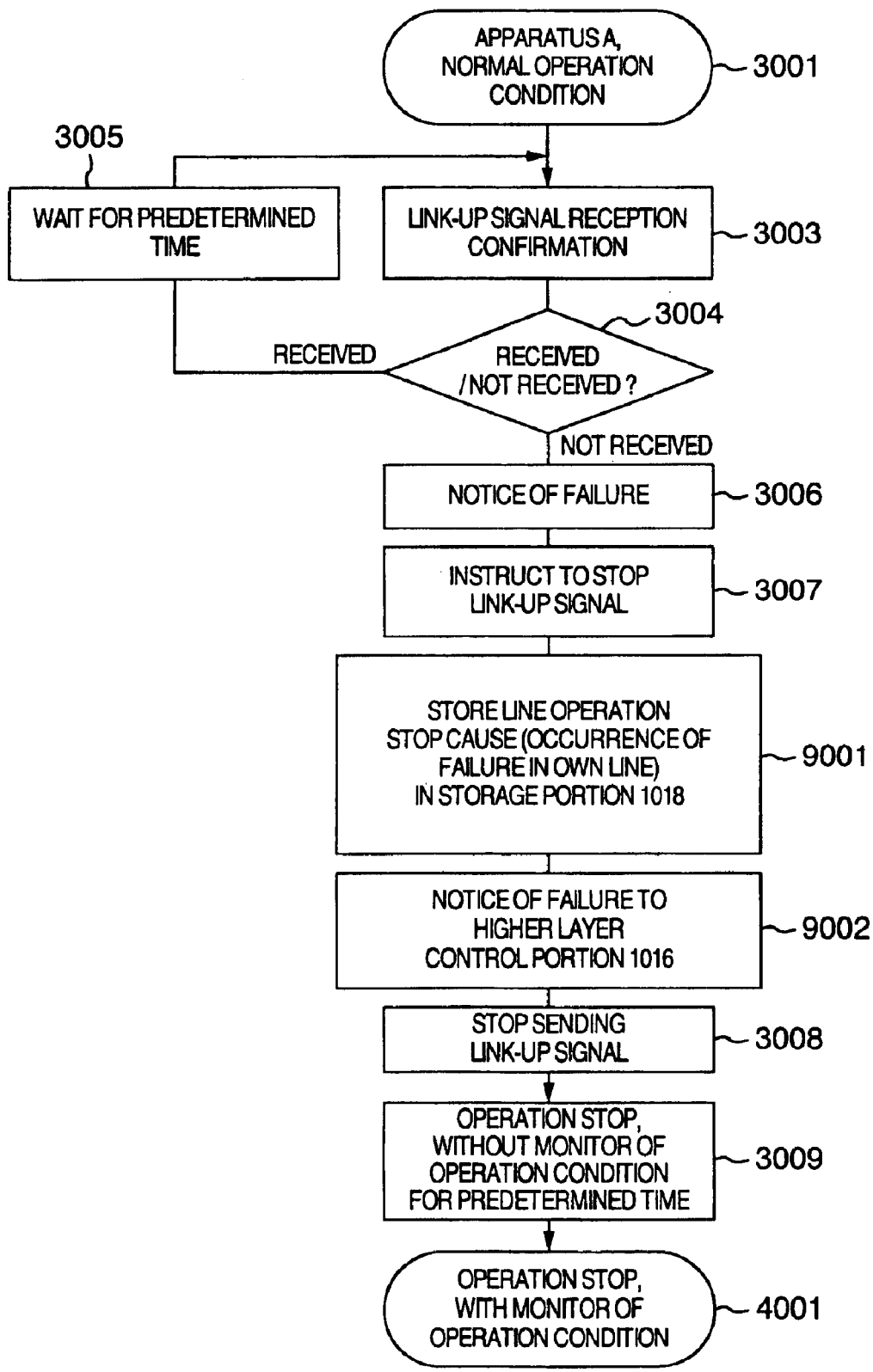
FIG. 9 is a flowchart using an example of the processing flow from the normal operation condition to the operation stop condition when the line failure detection/reporting system according to the second embodiment detects the failure of its own interface.

The interface 1010 starts detecting the failure in accordance with the processing procedure shown in FIG. 9, and executes the processing from Step 3001 to Step 3006 in exactly the same way as in the first embodiment. After the line control portion 1014 instructs the transmission control portion 1013 to stop transmission of the link-up signal in Step 3007, the operation stop cause storage portion 1018 stores "failure occurs in own line 1210 and operation stops" in Step 9001. The line control portion 1014 notifies the higher layer control portion 1016 of the occurrence of the failure in Step 9002. Subsequent Steps 3008 and 3009 in the interface 1010 are the same as those of the first embodiment.

Figure 11:
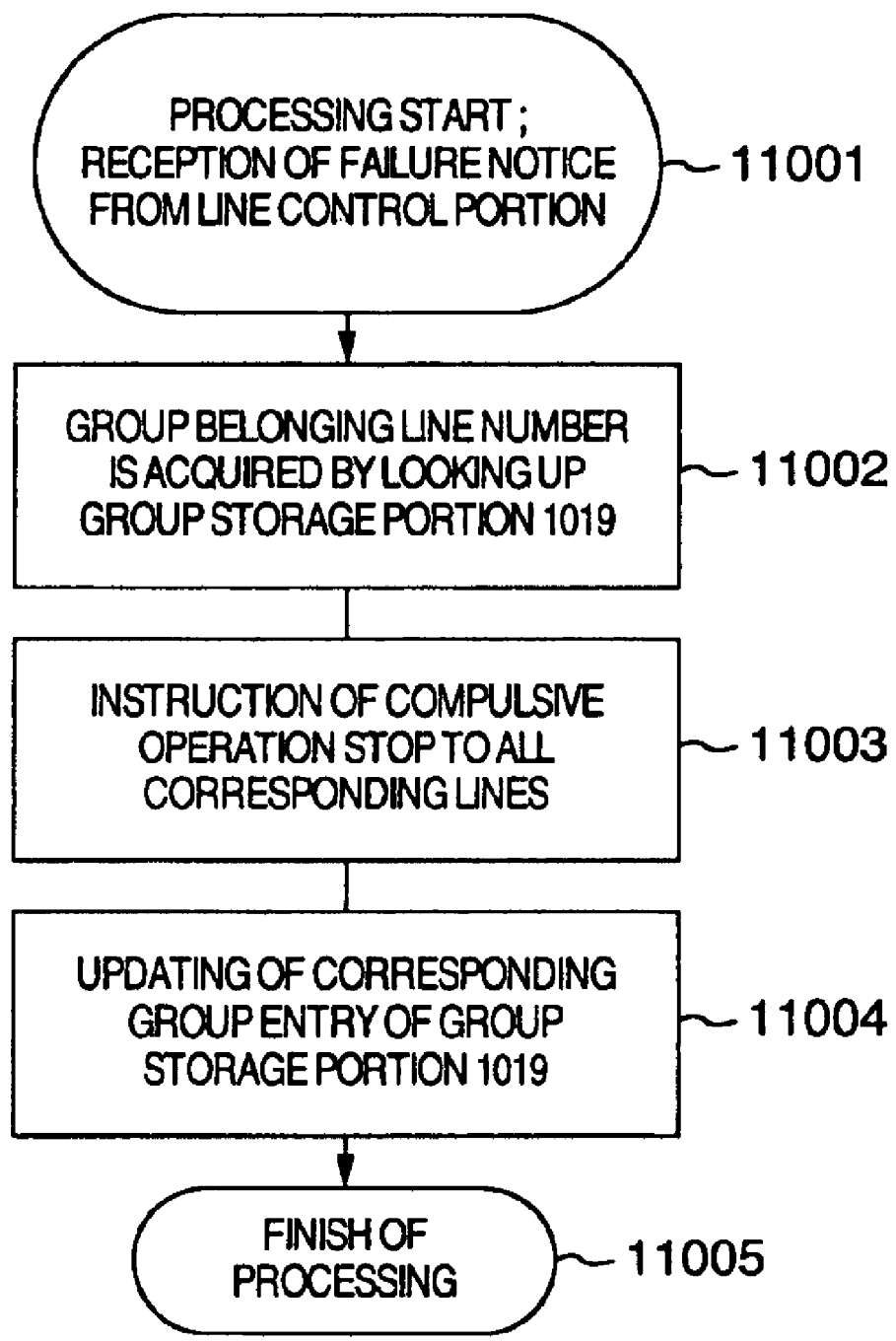
FIG. 11 is a flowchart showing a processing flow of a higher layer control portion when the whole circuit control portion belonging to the group including a failure-occurring line reaches the operation stop condition in the failure detection/reporting system according to the second embodiment.

On the other hand, the higher layer control portion 1016 executes the processing in accordance with the flow shown in FIG. 11. Receiving the notice of the occurrence of the failure from the line control portion 1014 of the interface 1010 (Step 11001), the higher layer control portion 1016 looks up the group storage portion 1019 and checks the numbers of all the interfaces/lines belonging to the same group as the interface 1010/line 1210 in which the failure develops. If the line control portion 1014 belongs to a plurality of groups, the numbers of the interfaces/lines belonging to the groups are checked for all the groups to which the line control portion 1014 belongs, and then the instruction to compulsively stop the operation is given to all the corresponding interfaces/lines (Step 11003). The higher layer control portion 1016 updates the table entry of the group storage portion 1019 and stores the stop condition due to the occurrence of the failure and the compulsive stop condition (Step 11004). The higher layer control portion 1016 finishes the processing in this way (Step 11005).

Figure 10:
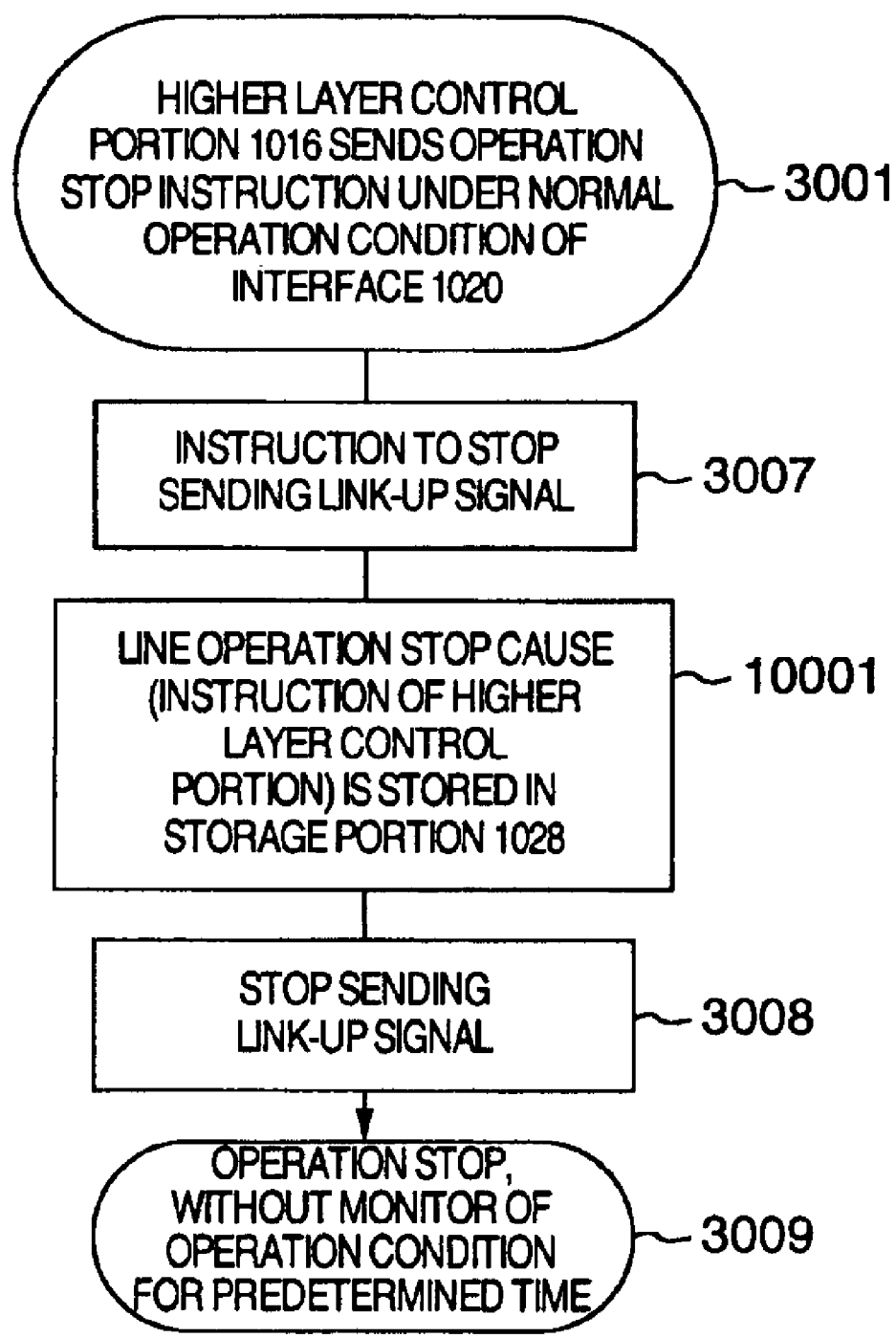
FIG. 10 is a flowchart showing an example of the processing flow from the normal operation condition to the operation stop condition when the line failure detection/reporting system according to the second embodiment detects a failure of another interface belonging to the same group and stops the operation.

Receiving the instruction to enter compulsively the operation stop condition, the line control portion 1024 executes the processing in accordance with the flow shown in FIG. 10. First, the line control portion 1024 receives the operation stop instruction under the normal condition from the higher layer control portion 1016 (Step 3001). Consequently, the line control portion 1024 instructs the transmission control portion 1023 to stop transmission of the link-up signal no matter whether or not the failure occurs in the line connected to its on interface 1020 (Step 3007). At the same time, the line control portion 1024 causes the line operation stop cause storage means 1028 to store "operation is compulsively stopped due to failure of line 1210 belonging to other interface 1010". The transmission control portion 1023 stops transmitting the link-up signal in accordance with the instruction from the line control portion 1024, and the interface 1020 enters the operation stop condition (Step 3009). In other words, the interface 1020 stops its operation by the instruction from the higher layer control portion 1016 but not by the detection of the failure in its own line. The insensitive time is provided immediately after the operation enters the operation stop condition in both interfaces 1010 and 1020 in the same way as in the first embodiment (Step 3009).

Next, the processing from the operation stop condition to the detection of the recovery of the failure and then to the restoration to the normal operation condition will be explained. It will be assumed hereby that the transmission line 1212 restores the normal condition from the failure under the condition where at least the interface 1010/line 1210 and the interface 1020/line 1220 belonging to the same group as the line 1210 keep stopping the operation due to the failure of the line 121 in accordance with the procedure described above. This restoration processing varies depending on the operation stop causes stored in the line operation stop cause storage means of the corresponding line control portion.

After entering the operation stop condition, the interface including the line, in which the failure occurs, examines the content of the line operation stop cause storage means 1018 of the line control portion 1014. In this case, the content reads as "failure occurs in own line 1210 and operation stops". Therefore, the interface 1010 detects the restoration from the failure in exactly the same processing procedure as the processing procedure shown in FIG. 4, and executes the restoration processing. When the line 1210 is restored and reaches the processing 4008 or 4108, the line control portion 1014 reports this effect to the higher layer control portion 1016.

The interface 1020 belonging to the same group as the line 1210/interface 1010 in which the failure occurs, too, enters the operation stop condition, and then examines the content of the line operation stop cause storage portion 1028. In this case, the content reads as "operation is compulsively stopped due to failure of line 1210 belonging to other interface 1010". Therefore, the interface 1020 does not execute the processing procedure shown in FIG. 4 for executing the spontaneous restoration processing. The reason why the interface 1020 does not execute the spontaneous restoration processing is because no failure occurs in itself and if the processing procedure is executed, the interface

1020 is restored instantaneously even though the failure of the interface 1010 belonging to he same group is not yet restored.

Figure 12:
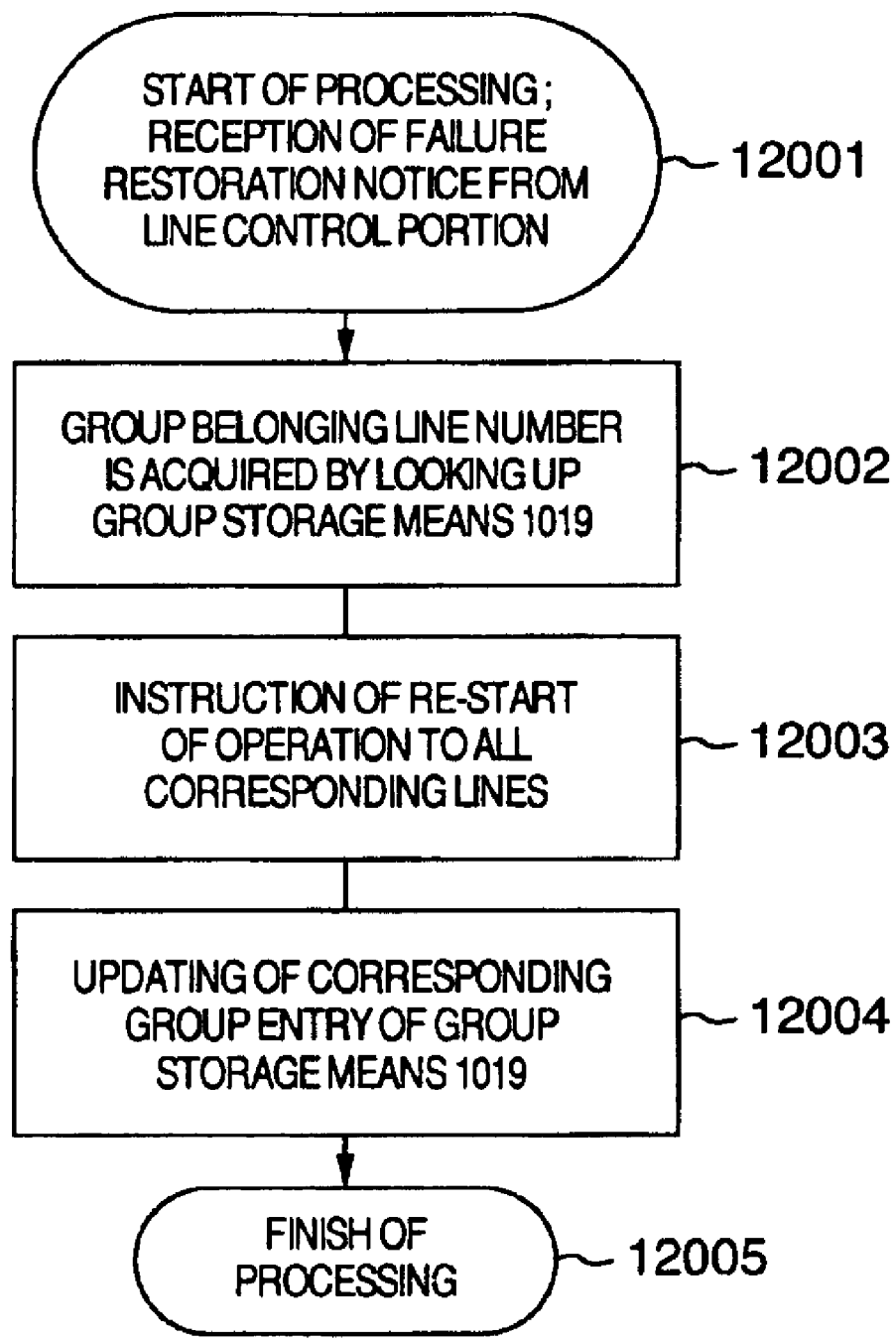
FIG. 12 is a flowchart showing a processing flow of the higher control portion when the whole circuit control portion returns to the operation condition as the failure in the failure-occurring line as the cause of the operation stop of the overall group is eliminated, in the line failure detection/reporting system according to the present invention.

On the other hand, the higher layer control portion 1016 executes the processing in accordance with the flow shown in FIG. 12. Receiving the restoration notice from the interface 1010 that has been under the operation stop condition due to the occurrence of the failure (Step 12001), the higher layer control portion 1016 examines the numbers of all the interfaces/lines belonging to the same group as the recovered interface 1010 while looking up the group storage means 1019 (Step 12002). If the line control portion 1014 belongs to a plurality of groups, the higher layer control portion 1016 examines the numbers of the line control portions of all the groups to which this line control portion 1014 belongs. Thereafter, the higher layer control portion 1016 releases the compulsive operation stop instruction to all the corresponding interfaces/lines, and instructs the re-start of the operation (Step 12003). Here, the interface 1020 corresponds to the object interface that receives the instruction. The higher layer control portion 1016 updates the table entry of the group storage means 1019 and records the normal operation condition. The interface 1020 does not have executed so far the spontaneous restoration processing as described above. Receiving the instruction from the higher layer control portion 1016, however, it executes exactly the same processing procedure as the processing procedure shown in FIG. 4, detects the restoration from the failure and executes the restoration processing. The higher layer control portion 1016 thus finishes its processing (S12005).

Figure 8:
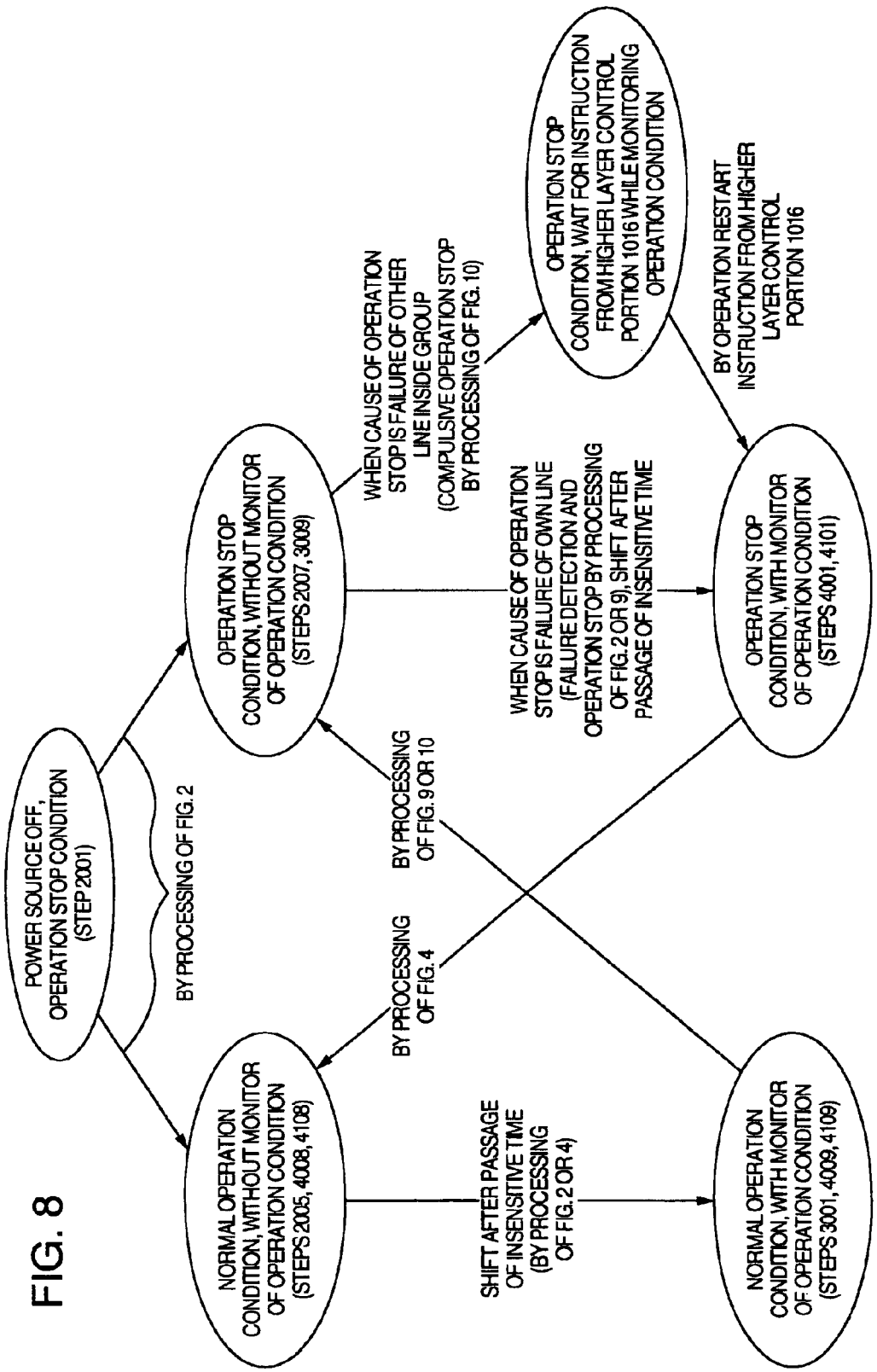
FIG. 8 is a diagram showing an example of the condition shift of an interface using the line failure detection/reporting system according to the second embodiment.

FIG. 8 shows the state shift of the interfaces by the line failure detection/reporting system of the second embodiment. The drawing shows the state shift of the interface 1110 of the apparatus 1000 explained above.

FIG. 8 shows the state shift from "power source off, operation stop condition" to "normal operation condition, with monitor of operation condition" through "normal operation condition, without monitor of operation condition", and from "power source off, operation stop condition" to "operation stop condition, with monitor of operation condition" through "operation stop condition, without monitor of operation condition", by the processing shown in FIG. 2. FIG. 8 shows also the state shift from "operation stop condition, with monitor of operation condition" to "normal operation condition, with monitor of operation condition" through "normal operation condition, without monitor of operation condition", by the processing shown in FIG. 4. Furthermore, it shows the state shift from "normal operation condition, with monitor of operation condition" to "operation stop condition, with monitor of operation condition" through "operation stop condition, without monitor of operation condition", by the processing shown in FIG. 9 in the case where the cause of the operation stop is the failure of its own line.

FIG. 8 shows further the state shift from "normal operation condition, with monitor of operation condition" to "operation stop condition, without monitor of operation condition" by the processing shown in FIG. 10. When the cause of the operation stop is the failure of other line inside the group, the operation is compulsively stopped, and the state shifts to "operation stop condition, without monitor of operation condition, waiting for instruction from higher layer control portion 1016". Further, the state shifts to "operation stop condition, with monitor of operation condition" due to the instruction of the operation direction from the higher layer control portion 1016, and thereafter shifts to the normal operation condition by the processing shown in FIG. 4.

Figure 5:
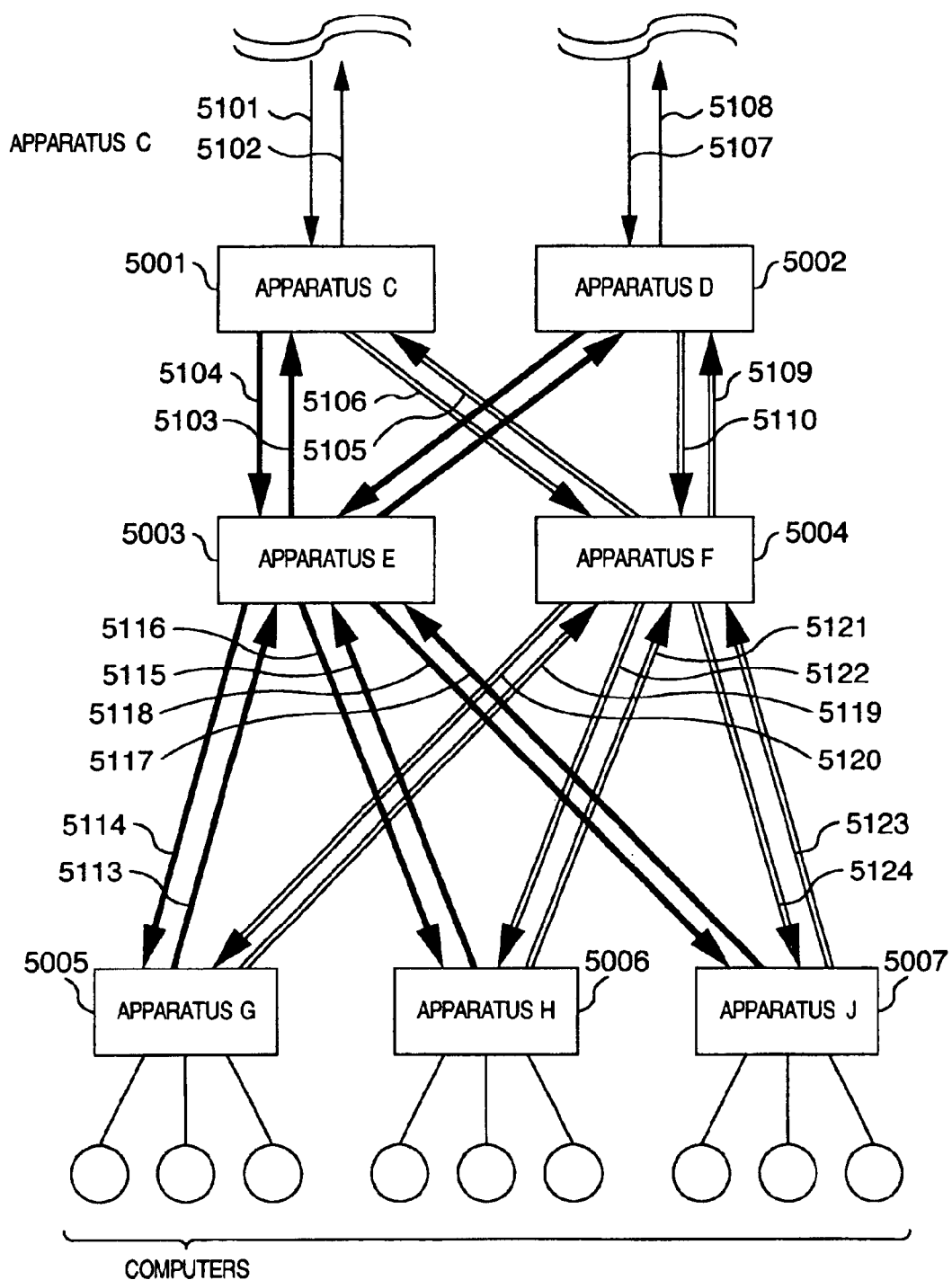
FIG. 5 is a system diagram showing a structural example of a network system using a line failure detection/reporting system according to the second embodiment of the present invention.

The processing procedure for executing the line failure detection notice by assembling the network by using the apparatus having the additional functions described above will be explained with reference to FIG. 5. FIG. 5 shows a structural example of the network using the apparatuses equipped with the line failure detection/reporting system of the embodiment explained with reference to FIG. 6. First, each portion will be explained.

Each of the apparatuses C5001, D5002, E5003, F5004, G5005, H5006 and J5007 is the apparatus equipped with the line failure detection/reporting system of the present invention explained with reference to FIG. 6. Transfer paths 5101 to 5124 are transfer paths for connecting mutually these apparatuses C5001 to J5007. Arrows of the transfer paths in the drawing represent the data transfer direction. Each odd-numbered transfer path and a transfer path having a number greater by "1" than the former are the transfer paths that connect the apparatus of the same combination in opposite directions, and the set of these two transfer paths constitutes one line. In this embodiment, the transfer path 5104 for transmitting data from the apparatus C5001 to the apparatus E5003 is called the "transfer path CE5104", and the transfer path 5103 for transmitting the data from the apparatus E5003 to the apparatus C5001, on the contrary, is called the "transfer path EC5103". The pair of the transfer path CE5104 and the transfer path EC5103 is called the "line EC5103" or the "line CE5104". The system shown in FIG. 5 employs the redundant construction, in which the apparatus E5003 and all the lines connected directly to this system constitute the "0" system and the apparatus F5004 and all the lines connected directly to this apparatus constitute the "1" system, by taking the apparatuses E5003, F5004 and the lines connecting to these apparatuses, into specific attention. In FIG. 5, thick lines represent the "0" system and double lines represent the "1" system. Communication is conducted generally by using either one of the "0" and "1" systems with the other being a standby system. When any one of the apparatuses C5001, D5002, E5003 and F5004 is broken, or when any of the lines connecting mutually the apparatuses G5005, H5006, J5007 and the apparatuses E5003 and F5004 is broken, for example, the whole system switches to the standby system and a bypass route is established by utilizing other lines/apparatuses. In consequence, the data communication can be continued. Here, the apparatuses G5005, H5006 and J5007 are the apparatuses that directly incorporate computers but do not employ the redundant construction. Incidentally, when any failure occurs in one of the systems of the redundant construction and must be switched to the other system, the line failure detection/reporting system of the present invention detects the failure. A suitable system switching protocol operates in this case on the basis of the failure detection to switch the systems. This system switching protocol is outside scope of the subject matter of the present invention.

Grouping and setting inside each apparatus in this embodiment will be explained. In the apparatus C5001, the line EC5103 belongs to the group "0" and the line FC5105 does to the group "1". In the apparatus D5002, the line ED5111 belongs to the group "0" and the line FD5109 does to the group "1". All the lines directly connected to the apparatus E5003 belong to the group "0" and all the lines directly connected to the apparatus F5004 belong to the group "1". In the apparatus G5005, the line GE5113 belongs to the group "0" and the line GF5119 does to the group "1". In the apparatus H5006, the line HE5115 belongs to the group "0" and the line HF5121 does to the group "1". In the apparatus J5007, the line JE5117 belongs to the group "0"

and the line JF5123 does to the group "1". The line 5102 of the apparatus C5001, the line 5107 of the apparatus D5002 and the lines for accommodating computers in the apparatuses G5005, H5006 and J5007, that are not described so far, do not belong to both of the groups "0" and "1". The lines and the interfaces belonging to the group "0" constitute the "0" system described above. The lines and the interfaces belonging to the group "1" constitute the "1" system described above. Incidentally, the number for identifying the group need not be always unified between the apparatuses so long as a consistent management is made inside each apparatus. However, the explanation will be hereby given by using the unified numbers.

It will be assumed that only the lines belonging to the group "0" are used in practice by the operation of the afore-mentioned system switching protocol in the system shown in FIG. 5 when all the apparatuses and lines operate normally. In other words, when the data communication needs be made through the apparatus G5005 and the apparatus C5001, the data is assumed to pass through the apparatus G5005, the line GE5113, the apparatus E5003, the line EC5103 and the apparatus C5001. Here, the explanation will be given on the processing when the failure occurs in the transfer path GE5113 between the apparatus E5003 and the apparatus G5005.

It is the apparatus E5003 positioned on the reception side of the transfer path GE5113 that first detects the failure. Detecting the failure, the apparatus E5003 stops transmitting the link-up signal to the transfer path EG5114 in accordance with the state shift shown in FIG. 8, reports the failure to the apparatus G5005, stops the operation of the interface accommodating the line EG5114 of the own apparatus and reports the failure occurrence to the higher layer control portion inside the apparatus. Since the line EG5114 belonging to the group "0" stops operating due to the failure, the higher layer control portion inside the apparatus E5003 instructs all the other interfaces of the same group inside the apparatus to compulsively stop the operation. In this case, since all the interfaces of the apparatus G5003 belong to the group "0", all the lines other than the line EG5114, in which the failure occurs, are brought compulsively into the operation stop condition. The apparatuses C5001, D5002, H5006 and J5007 connected directly to the apparatus G5003 recognize this state as the line failure and stop the operation of the lines EC5103, ED5111, EH5116 and EJ5118, respectively. The lines that belong to the group "0" managed internally by the respective higher layer control portions inside these four apparatuses are only those lines which are directly connected to the apparatus E5003. Therefore, the processing finishes at this point. However, the apparatus G5005 detects the operation stop of the transfer path EG5114 by the apparatus E5003, brings the interface accommodating the line EG5114 into the operation stop condition and at the same time, reports the failure occurrence to the higher layer control portion inside the apparatus. Inside the apparatus G5005, it is only the line EG5114 that belongs to the group "0" managed by the higher layer control portion. Therefore, the processing finishes at this point. All the lines belonging to the group "0" stop operating due to the processing described so far in the system shown in FIG. 5, and the apparatus E5003 is cut off from the system. The time from the occurrence of the failure in the transfer path GE5113 to the arrival at this state is as high as about 0.5 seconds in the 10 Base-T technology using the twist-pair cable, for example. Thereafter, the occurrence of the line failure is reported to the system switching protocol, and the operation system of the whole system is switched, so that the system can continue the normal operation. Incidentally, when the apparatus E5003 itself undergoes breakage and stops operating, too, the same processing procedure is executed.

The system switching protocol for accomplishing the redundant construction system is accomplished in many cases by a layer that is relatively higher than the physical layer in an OSI (open System Interconnection) reference model, such as a network layer and a transport layer. Therefore, there is a case where this protocol does not operate smoothly when any failure occurs at only a limited part of the system and a relatively long time is necessary before the whole system is switched. In the present system, however, since the processing is executed at the level of the physical layer, system switching can be made at a high speed and reliably by using the apparatuses according to the present system.

Incidentally, the explanation given above assumes the case where the whole system is switched when the failure occurs even at one position. However, it may be possible to employ the method of setting the groups so that only the failure portion can be cut off and the system can be switched partially. For example, setting is made so that the lines CE5104 and EG5144 belong to the group "0", the lines CF5106 and FG5120 belong to the group "1", the lines CE5104 and EH5116 belong to the group "2", the lines CF5106 and FH5122 belong to the group "3", the lines CE5104 and EJ5118 belong to the group "4" and the lines CF5106 and FJ5124 belongs to the group "5". Generally, the operation is conducted using the groups "0", "2" and "4". When the failure occurs in the transfer path GE5113 in the same way as in the example given above, only the group "0" is switched to the group "1" while the other groups "2" and "4" continue to operate as such. In this way, it is possible to continue the operation by only switching the group, in which the failure occurs, without switching the whole groups. In this case, the lines CE5104 and CF5114 belong to a plurality of groups, but the processing procedure remains the same.

The explanation given above is based on the assumption that the apparatuses C5001 to J5007 shown in FIG. 5 are the inter-network apparatuses, but they may be computers as described in the starting paragraph of the second embodiment.

The two embodiments of the present invention have thus been explained, and this explanation deals with only the application to the IEEE802.3 system network. However, the present invention is not limited to the IEEE802.3 system network, but can be applied to the data transfer system that has independently transfer paths on the transmission side and transfer paths on the reception side, has a failure detection function of the transfer paths on the reception side that can be applied in common to all apparatuses but does not have the failure detection function of the transfer paths on the transmission side that can be applied in common to all the apparatus. When applied, the present invention can reliably conduct the failure detection notice. Even when the data transmission system having the failure detection function of the transfer paths on the reception side and the failure detection function of the transfer paths that can be applied in common to all the apparatuses, the system of the present invention, when applied to such a data transmission system, can process at a high speed and reliably the failure detection notice, and can sometimes witch reliably the processing systems.

When link aggregation, that is the technology under the standardization work in IEEE802.3ad, is utilized, a plurality of physical lines for connecting two apparatuses can be aggregated into one logical line and communication can be conducted. Therefore, let's consider a case where the system of the present invention is applied to the lines using this technology. A functional block for executing the failure detection/reporting processing of the first embodiment is provided to each physical line, and a functional block for executing the failure detection/reporting processing of the first or second embodiment is provided to the logical line that aggregates these physical lines into one line. The failure of the physical lines is detected and reported by the same method as that of the first embodiment. In the logical lines, the failure of the logical line is detected when the failure occurs in all the physical lines belonging to the logical line and the communication cannot be continued at the level of the logical line. According to this construction, the logical line can be operated normally under the state so long as at least one of the physical lines executes normal communication. When all the physical lines can no longer conduct normal communication, the processing can be executed in accordance with the failure detection/reporting system of the first or second embodiment.

Incidentally, it is possible to accomplish the whole, or a part, of the functions of the network interface shown in FIGS. 1 and 6 by a one-chip semiconductor integrated circuit.

What is claimed is:

1. A method for sending a notice of failure detection in a system connecting first and second network interfaces incorporated in first and second apparatuses by a line including a transmission side transfer path and a reception side transfer path, said system performing data communication between said first and second apparatuses via said line, wherein:

said first and second network interfaces periodically transmit a utilizability signal representing normality of said line or an own apparatus to said transmission side transfer path;

said first apparatus judges an occurrence of a failure when it cannot detect said utilizability signal from said second network interface of said second apparatus as a mating apparatus for a predetermined period from said reception side transfer path;

said first network interface of said first apparatus stops transmitting said utilizabiltiy signal to be transmitted to said network interface of said second apparatus, and thereby reports the occurrence of the failure to said second apparatus;

when said first network interface of said first apparatus stops transmitting said utilizability signal, said first apparatus starts transmitting periodically said utilizability signal to said reception side transfer path after passage of a predetermined period, and monitors thereafter whether or not said utilizability signal can be detected on said reception side transfer path;

said first apparatus judges that the failure is not yet restored when said first apparatus cannot detect said utilizability signal for the predetermined period on said reception side transfer path, and stops again transmitting said utilizability signal that has been transmitted periodically to said transmission side transfer path; and when said first apparatus can detect continuously said utilizability signal on said reception side transfer path for a predetermined period, on the other hand, said first apparatus judges that the failure is restored, continues thereafter to transmit periodically said utilizability signal, and starts again the data communication.

2. A method for sending a notice of failure detection according to claim 1, wherein:

at least one of said first and second apparatuses includes a plurality of network interfaces as a group, and stops transmitting said utilizability signal from all of said network interfaces inside said group when the failure occurs in one of said network interfaces or in said reception side transfer line connected to said network interface, and said utilizability signal cannot be detected from said reception side transfer path.

3. A method for sending a notice of failure detection according to claim 1, wherein the data communication is stopped simultaneously with the stop of transmission of said utilizability signal of said transfer path.

4. A method for sending a notice of failure detection according to claim 1, wherein the data communication is started again simultaneously with restart of transmission of said utilizability signal of said transfer path.

5. A method for sending a notice of failure detection in a system connecting first and second network interfaces incorporated in first and second apparatuses by a line including a transmission side transfer path and a reception side transfer path, said system performing data communication between said first and second apparatuses via said line, wherein:

said first and second network interfaces periodically transmit a utilizability signal representing normality of said line or an own apparatus to said transmission side transfer path;

said first apparatus judges an occurrence of a failure when it cannot detect said utilizability signal from said second network interface of said second apparatus as a mating apparatus for a predetermined period from said reception side transfer path;

said first network interface of said first apparatus stops transmitting said utilizabiltiy signal to be transmitted to said network interface of said second apparatus, and thereby reports the occurrence of the failure to said second apparatus;

at least one of said first and second apparatuses includes a plurality of network interfaces as a group, and stops transmitting said utilizability signal from all of said network interfaces inside said group, when the failure occurs in one of said network interfaces inside said group or in said reception side transfer path connected to said network interface, and said utilizability signal cannot be detected from said reception side transfer path.

6. A method for sending a notice of failure detection in a system connecting first and second network interfaces incorporated in first and second apparatuses by a line including a transmission side transfer path and a reception side transfer path, said system performing data communication between said first and second apparatuses via said line, wherein:

said first and second network interfaces periodically transmit a utilizability signal representing normality of said line or an own apparatus to said transmission side transfer path;

when said first apparatus cannot receive said utilizability signal of said transfer path on said reception side transfer path for receiving data from said network interfaces of said second apparatus for the predetermined time and judges that the failure occurs, said first apparatus intentionally stops transmitting said utilizability signal that has been transmitted periodically to said transfer path for transmitting the data to said interfaces of said second apparatus;

said first apparatus starts transmitting periodically said utilizability signal to said transmission side transfer path after the passage of the predetermined time, and thereafter monitors whether or not said utilizability signal can be detected on said reception side transfer path;

when said utilizability signal cannot be detected on said reception side transfer path for the predetermined time, said first apparatus judges that the failure is not restored, stops again intentionally transmitting said utilizability signal that has been transmitted periodically to said transmission side transfer path, starts again transmitting periodically said utilizability signal to said transmission side transfer path after the passage of the predetermined time, and repeats the monitor processing of said reception side transfer path until said utilizability signal can be detected on said reception side transfer path; and when said utilizability signal can be detected continuously on said reception side transfer path for the predetermined time, said first apparatus judges that the failure is restored, keeps thereafter periodical transmission of said utilizability signal, and starts again the data communication.

7. A network apparatus in a network system having one or more network interfaces incorporated in two apparatuses and connected by a line including a transmission side transfer path and a reception side transfer path electrically isolated from one another, wherein:

said network interfaces are classified into groups, at least one of said network interfaces belongs to each of said groups, and a network interface is allowed to belong to a plurality of said groups; and each of said network interfaces includes means for stopping transmission of a utilizability signal to be transmitted to said transmission side transfer path when a failure is judged as occurring in said reception side transfer path, and means for stopping transmission of said utilizability signal to said transmission transfer path in all of said network interfaces belonging to the same group as said network interface when the failure is detected in at least one network interface belonging to a group associated with its own network interface.

8. A network apparatus according to claim 7, wherein each of said network interfaces includes means for continuing transmission of said utilizability signal to said transmission side transfer path and starting again simultaneously data communication when the failure of said reception side transfer path is judged as being restored, and means for starting transmission of said utilizability signal to said transmission side transfer line in all of said network interfaces belonging to the same group as said interface when failure restoration is detected after the passage of a predetermined time from the failure detection.

9. A network system having redundant routes of a plurality of systems constituted by using said network apparatus according to claim 7, for cutting off reliably and at a high speed a failure occurrence portion and assisting switching of said redundant routes at the time of occurrence of the failure by setting groups in accordance with a switching unit at the time of the occurrence of the failure.

* * * * *